United States Patent Office 3,153,487
Patented Oct. 20, 1964

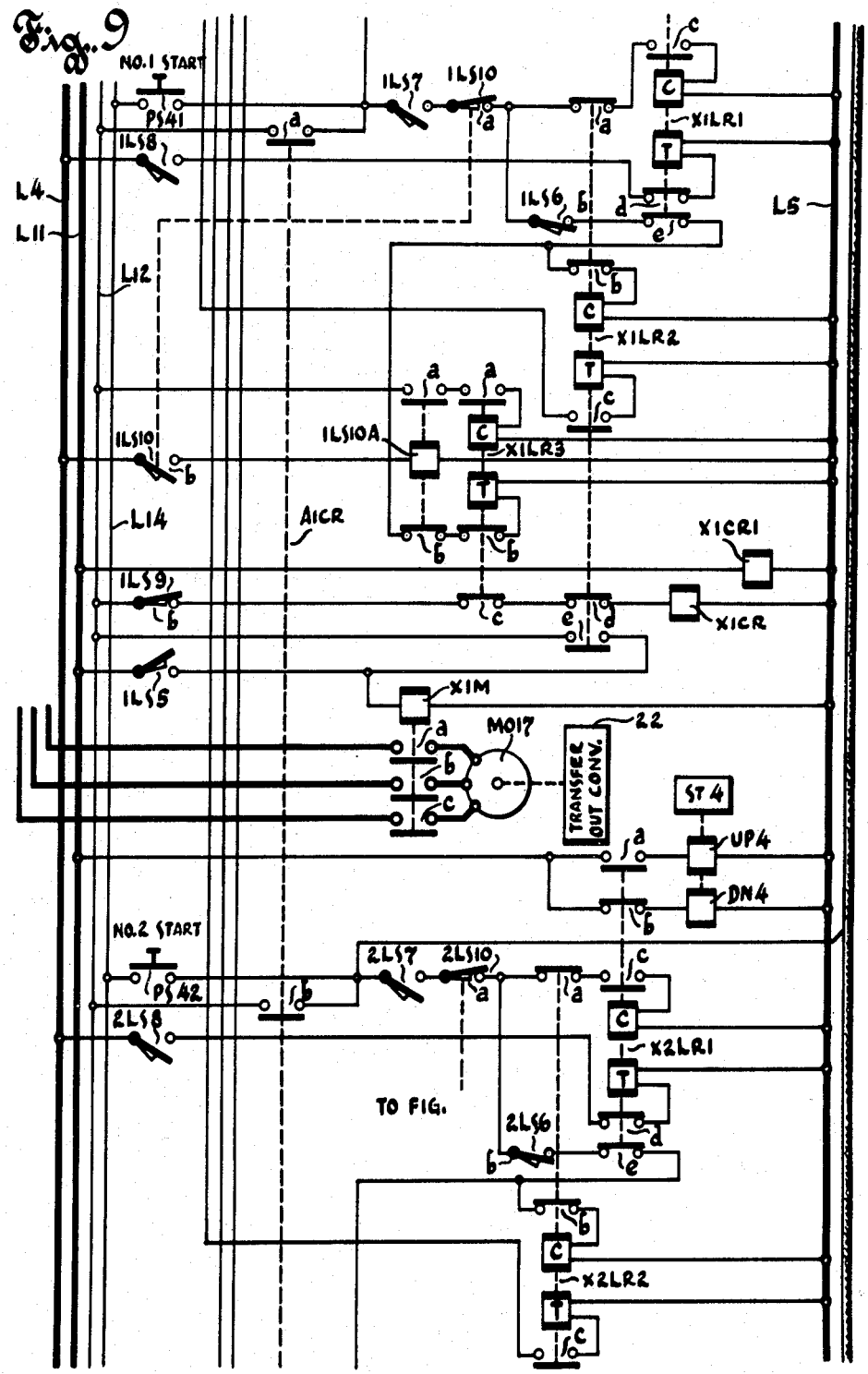

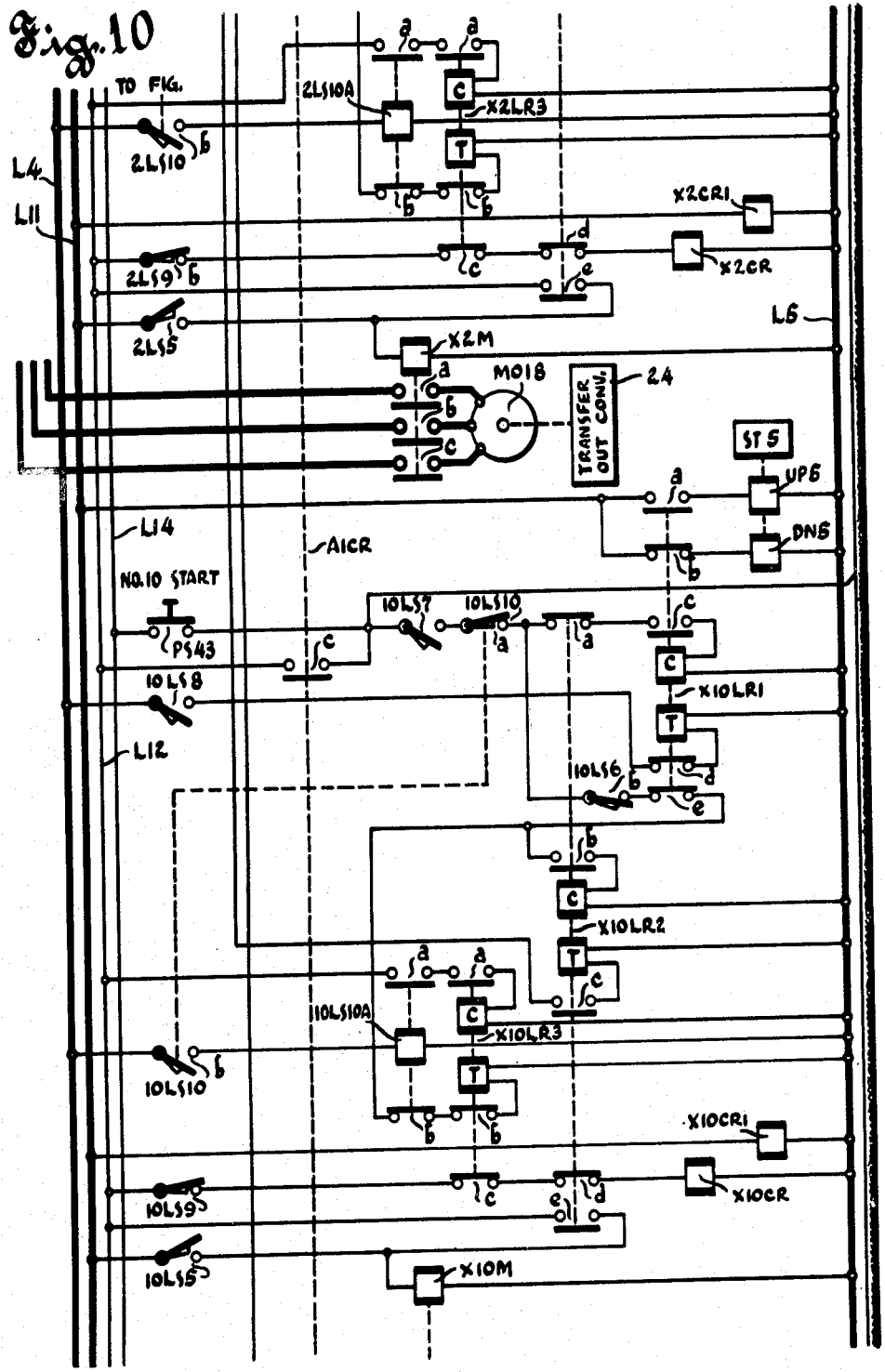

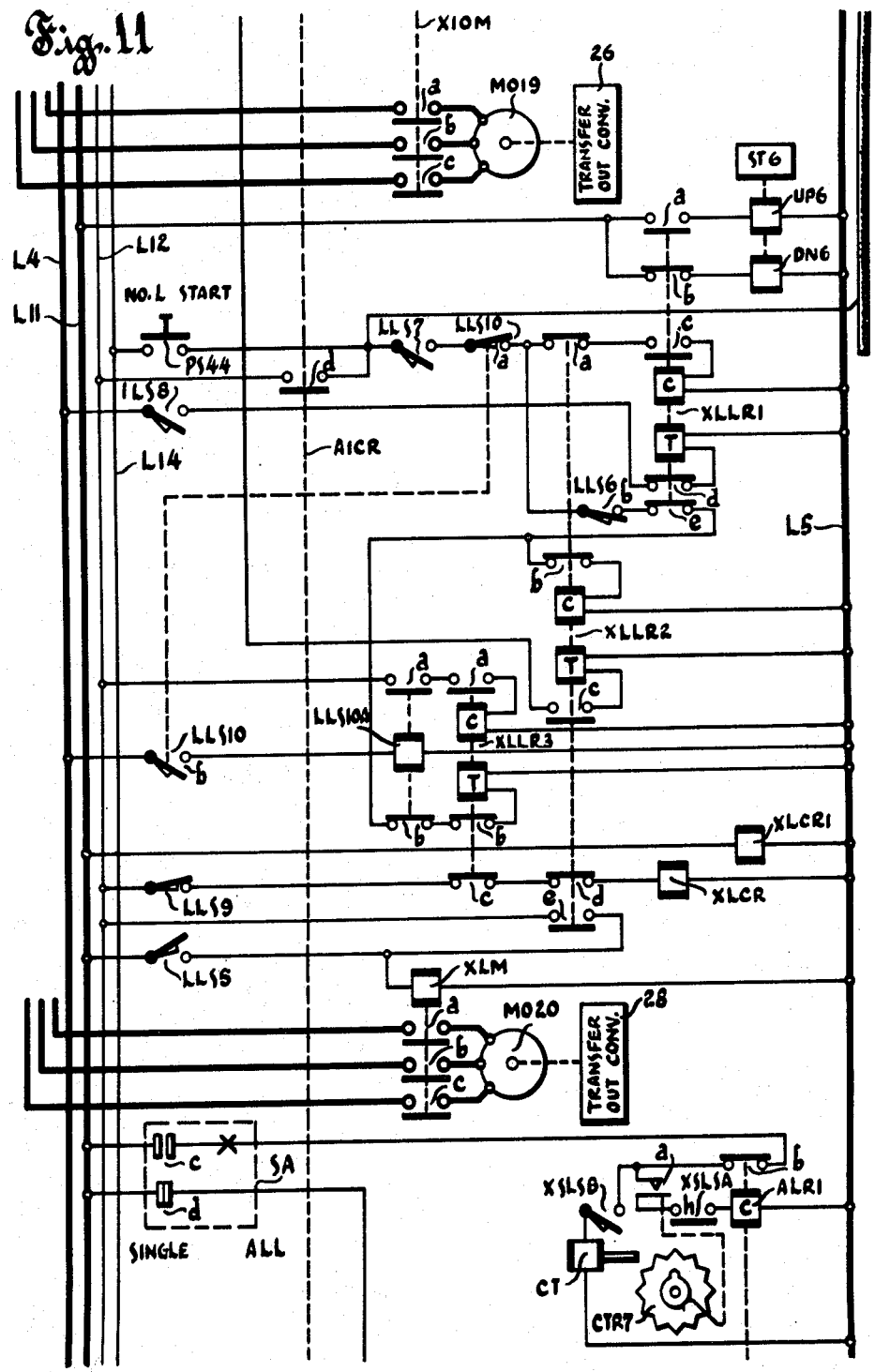

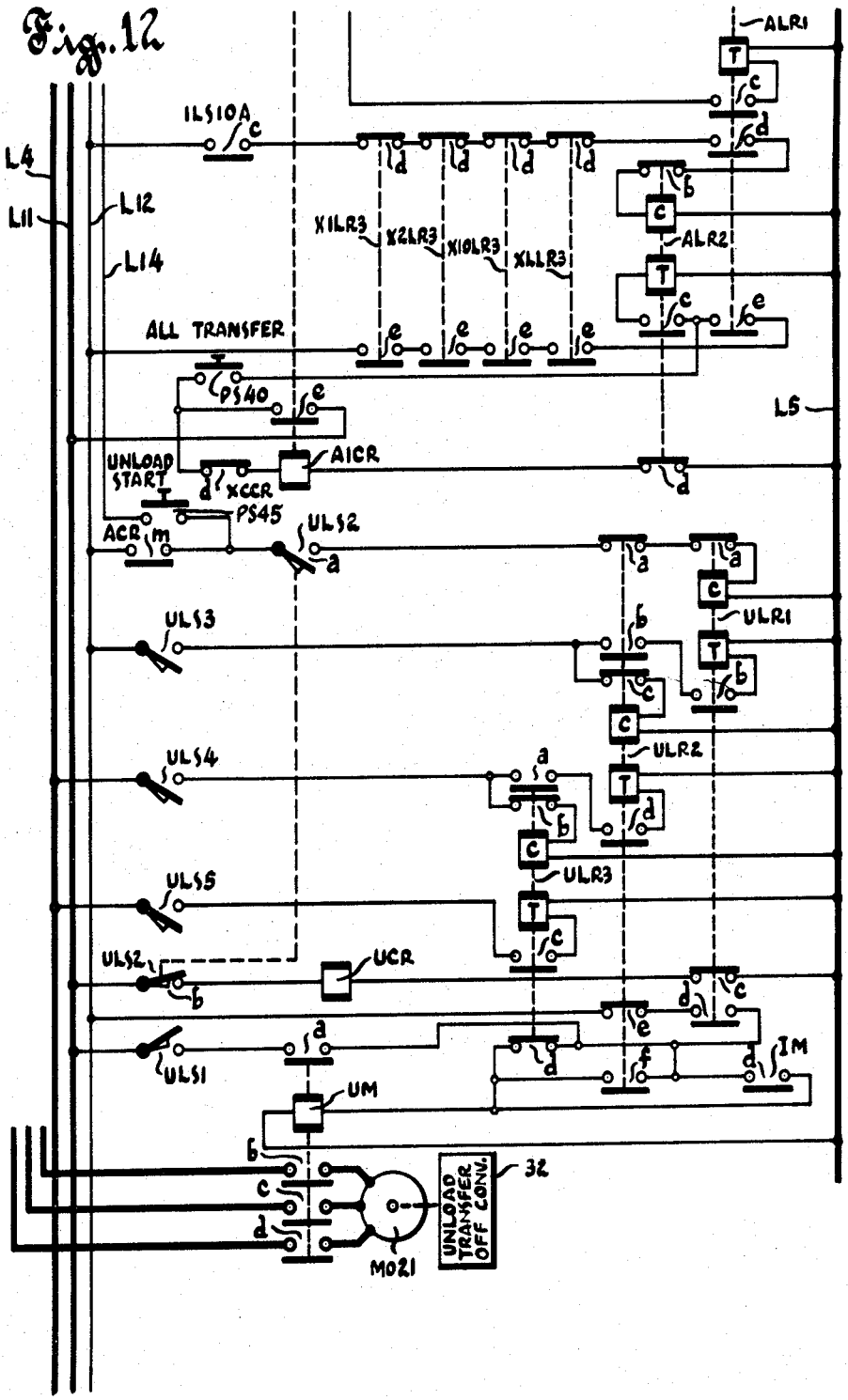

3,153,487
STORAGE CONVEYOR SYSTEM
Earl E. Hoellen, Hales Corners, Wis., assignor to Cutler-Hammer, Inc., Milwaukee, Wis., a corporation of Delaware
Original application Aug. 30, 1960, Ser. No. 52,846, now Patent No. 3,118,549, dated Jan. 21, 1964. Divided and this application Mar. 20, 1963, Ser. No. 266,650
10 Claims. (Cl. 214—16)

This invention relates to storage conveyor systems and more particularly to systems for selectively controlling withdrawal of articles from selected storage conveyors in a desired order.

While not limited thereto, the invention is especially applicable to conveyor systems having a buffer storage area for storage of automobile bodies or the like awaiting conveyance thereof into a production line.

An object of the invention is to provide an improved conveyor system.

Another object of the invention is to provide an improved storage conveyor control system for controlling withdrawal of articles from selected storage conveyors onto an outgoing conveyor in a sequence such that the articles are arranged in succession on the outgoing conveyor in the selected order and are thereby conveyed to an assembly line whereby the storage conveyors provide a collection area affording a supply of a given type or types of articles for selective withdrawal to maintain operation of the assembly line during times when other types of articles cannot be utilized therein.

A more specific object of the invention is to provide an improved conveyor control system for controlling selective withdrawal of articles from a plurality of storage conveyors.

Another specific object of the invention is to provide an improved conveyor control system for controlling selective withdrawal of articles from a plurality of storage conveyors onto an outgoing conveyor in a sequence such that the articles are arranged in succession on the outgoing conveyor in accordance with the selection.

A further object of the invention is to provide an improved conveyor control system for controlling withdrawal of an article from each of a plurality of storage conveyors concurrently onto an outgoing conveyor.

A related object of the invention is to provide in such control system selectable automatic and manual control means for controlling the aforementioned functions.

This application is a division of copending application Serial No. 52,846, filed August 30, 1960, now Patent No. 3,118,549 dated January 21, 1964. According to such patent, there is provided a storage conveyor system having an incoming conveyor for conveying articles in succession toward a storage area, an accumulator conveyor for accumulating a predetermined number of articles from the incoming conveyor awaiting storage, an entry shuttle conveyor having access from the accumulator conveyor and operable to travel past the entry ends of a plurality of storage conveyors for conveying articles to the latter in a selected order, an exit shuttle conveyor operable to travel past the exit ends of the storage conveyors for receiving articles from the latter, an outgoing conveyor having access from the exit shuttle conveyor for conveying withdrawn articles to an assembly line, and appropriate transfer rams or transfer conveyors for effecting transfer of the articles between the aforementioned conveyors. A control system is provided for controlling admission to and withdrawal of articles from the storage conveyors, such control system being under the control of a plurality of entry and exit control pushbuttons and limit switches. Such control system is operable to control the aforementioned conveyors or transfer rams and is also operable to control a plurality of article stops at various points in the conveyor system to control the movement of the articles. Also, such control system is transferable between automatic and manual control to afford flexibility in its operation.

This application relates to the exit portion of the aforementioned storage conveyor system including a control system therefor whereby articles may be selectively withdrawn from the storage conveyors in a desired order and conveyed to an outgoing conveyor. For a disclosure of the entry portion of the storage conveyor system affording selective control of conveyance of articles onto the storage conveyors, reference may be had to the aforementioned patent.

The aforementioned and other objects and advantages of the invention and the manner of obtaining them will best be understood by reference to the following detailed description of an exemplary embodiment of a storage conveyor system and control system therefor taken in conjunction with the accompanying drawings, wherein:

FIGS. 4 through 12 diagrammatically show the control circuits for controlling the conveyor system of FIG. 1; FIGS. 4 through 12 showing various conveyor motor control circuits and circuits for controlling the exit cycle, that is, the withdrawal of articles from storage.

Figure 1:
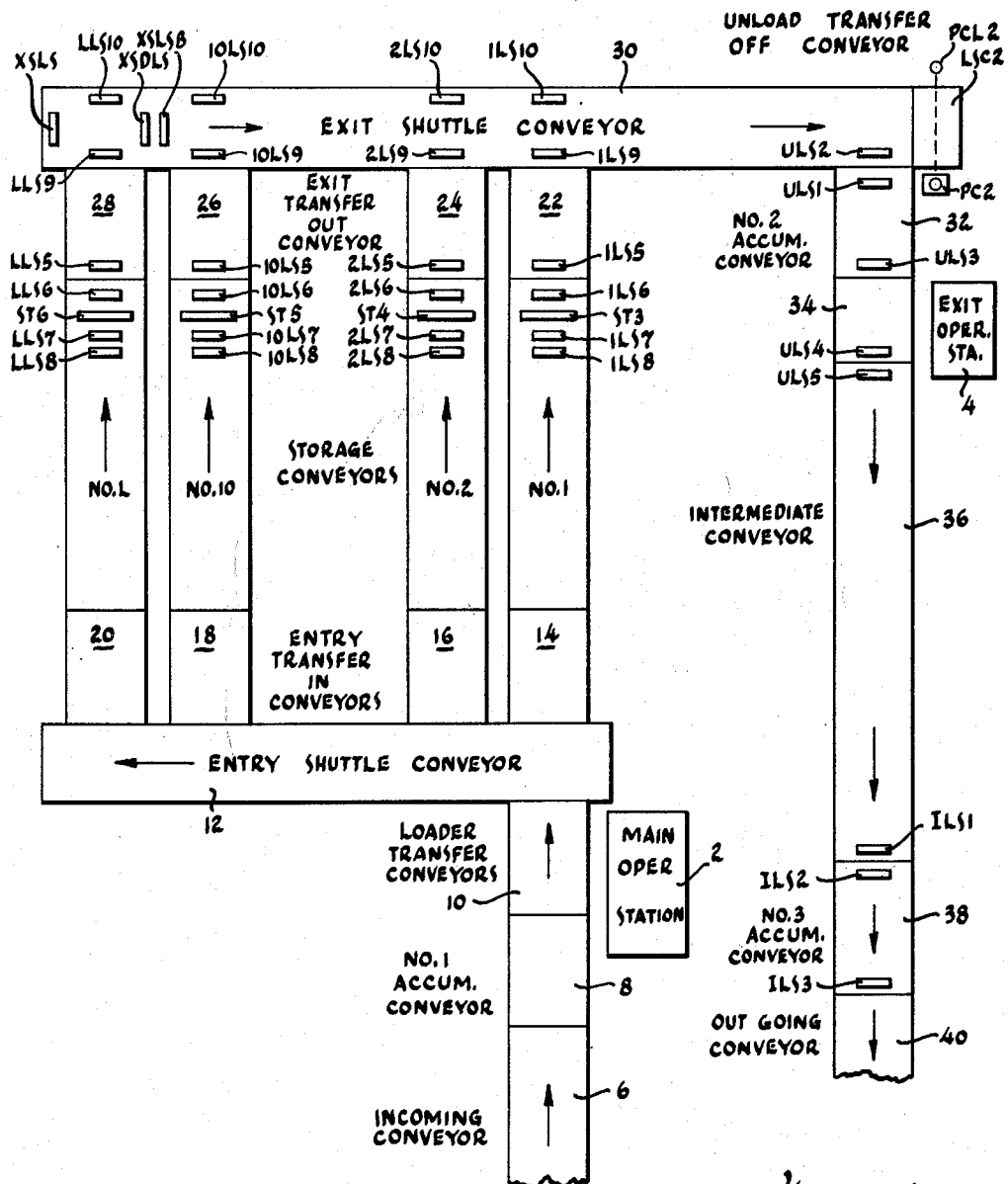
FIGURE 1 is a schematic illustration of a conveyor system layout constructed in accordance with the invention.

Referring to FIG. 1, there is shown a storage conveyor system layout having a main operator's station provided with a control panel 2 for controlling entry or storage of articles and exit or withdrawal of articles and an exit operator's station having a control panel 4 for controlling exit or withdrawal of articles from storage under manual controls.

The entry portion of the conveyor system comprises an incoming conveyor 6 for conveying articles toward the storage area. Incoming conveyor 6 has direct access to a No. 1 accumulator conveyor 8 whereon a predetermined number of articles are accumulated and temporarily stored awaiting movement thereof to the storage conveyors. Accumulator conveyor 8 in turn has direct access to a ram type loader transfer conveyor 10 for successively transferring articles from accumulator conveyor 8 onto an entry shuttle conveyor 12. A plurality of storage conveyors Nos. 1, 2, 10 and L are equally spaced along shuttle conveyor 12 and arranged transversely relative to the latter and a corresponding plurality of entry transfer-in conveyors 14, 16, 18 and 20 are arranged between shuttle conveyor 12 and the respective storage conveyors for transferring articles from the shuttle conveyor onto the respective storage conveyors. While four storage conveyors have been shown for ease of illustration, it will be apparent that any desired number thereof can be provided, L being indicative of the total number of and the last storage conveyor.

The exit portion of the conveyor system comprises the aforementioned storage conveyors and a plurality of ram type exit transfer-out conveyors 22, 24, 26 and 28 arranged between the exit ends of the respective storage conveyors Nos. 1, 2, 10 and L and an exit shuttle conveyor 30, these transfer-out conveyors being equally spaced along and having access to the exit shuttle conveyor. The latter has direct access to an unload transfer-off conveyor 32 for transferring articles from exit shuttle conveyor 30 to a No. 2 accumulator conveyor 34. Accumulator conveyor 34 is provided for transferring articles from unload transfer-off conveyor 32 to intermediate conveyor 36 which conveys the articles away from the storage area. At the exit end of intermediate conveyor 36, there is provided another No. 3 accumulator conveyor 38 which functions to gather the articles, that is, to eliminate any gaps therebetween before such articles enter upon an outgoing conveyor 40.

All of the conveyors shown in FIG. 1 and pertaining to this invention are adapted for supporting and moving therealong four-wheeled trucks which support the articles being conveyed such as autobodies or the like. Storage conveyors Nos. 1, 2, 10 and L and exit transferout conveyors 22, 24, 26 and 28 move the article supporting trucks in the forward direction. Exit shuttle conveyor 30 moves the trucks sideways in the right-hand direction in FIG. 1. Unload transfer-off conveyor 32, No. 2 accumulator conveyor 34, intermediate conveyor 36, No. 3 accumulator conveyor 38 and outgoing conveyor 40 move the trucks in the reverse direction. Therefore, if the articles are positioned on the trucks in storage in the reverse direction, they will come out on the outgoing conveyor in the forward direction, the conveyor system effecting turning of the trucks 180 degrees.

Unload transfer off conveyor 32, intermediate conveyor 36 and outgoing conveyor 40 are preferably of similar type. In accordance with the detailed description of operation of the conveyor control system hereinafter appearing, each of these conveyors is disclosed as being of a type which positively moves the truck when the conveyor is running and stops moving the truck when the conveyor is stopped. While conveyors for doing this may take various forms, for exemplary purposes, each of these conveyors is preferably provided with a roadway comprising a pair of spaced, parallel tracks along which the trucks may be rolled and a motor-driven device for pushing the trucks along the tracks. This device may be an endless chain moved by motor-driven sprockets and having one or more projections or dogs thereon. The dogs are mounted on the chains for engaging the undercarriage of the trucks, to push the same along the tracks. Unload transfer off conveyor 32 may be provided with a single dog on the chain thereof so that when this conveyor is started running, such dog hooks the undercarriage at the rear end of the truck and pulls it off the extreme right-hand end of the exit shuttle conveyor and pushes it onto No. 2 accumulator conveyor 34. Intermediate conveyor 36 is preferably provided with a plurality of dogs spaced apart on its chain. Each time a truck reaches the idle point hereinafter described adjacent the entry end of the intermediate conveyor, the next dog on the chain hooks this truck and pushes it along the intermediate conveyor. This conveyor 36 normally runs continuously except that it is stopped whenever No. 3 accumulator conveyor 38 is full as hereinafter described. Outgoing conveyor 40 is preferably like the intermediate conveyor and is provided with a plurality of dogs on its chain, these dogs being spaced apart in accordance with the lengths of the trucks as desired. So long as No. 3 accumulator conveyor 38 is not empty, each successive dog on the outgoing conveyor pusher chain will hook a truck and move the trucks in equally spaced relation to the assembly line. As will be apparent, the purpose of the No. 3 accumulator conveyor is to maintain a constant supply of article trucks at the entry end of the outgoing conveyor whereby to gather the articles and eliminate any spaces therebetween.

Storage conveyors Nos. 1, 2, 14 and L, No. 2 accumulator conveyor 34 and No. 3 accumulator conveyor 38 are preferably of similar type except that conveyor 34 is not provided with an article stop and is additionally provided with an "idle" or inactive portion at the exit end thereof. In accordance with the detailed description of operation of the control system hereinafter appearing, each of these conveyors is disclosed as being of the type which runs continuously and conveys the trucks therealong. Since these conveyors with the exception of No. 2 accumulator conveyor are each provided with an article stop hereinafter described, provision is made for permitting these conveyors to continue running after the article is stationary against the stop. While conveyors for doing this may take various forms, for exemplary purposes, each of these conveyors is provided with a pair of spaced apart, motor driven chain-type conveyor belts. The respective pairs of side wheels of the trucks are supported by the belts of such pair thereof and the moving belts convey the truck along each such conveyor. When the truck engages the stop on those conveyors having such stop, the belts continue to move and turn the truck wheels but the truck remains stationary against the stop. No. 2 accumulator conveyor 34 similarly conveys a truck therealong to the "idle" portion thereof immediately adjacent the entry end of the intermediate conveyor. This idle roll portion or transfer portion permits free entry of a truck conveyed thereto by the accumulator conveyor belts but does not move the trucks therefrom. Thus, each truck will idle or rest on this portion of the conveyor whenever the intermediate conveyor is stopped and until it is pulled therefrom by a dog on the intermediate conveyor chain when the intermediate conveyor is restarted.

Exit transfer out conveyors 22, 24, 26 and 28 are preferably of similar type. In accordance with the description of operation of the control system hereinafter appearing, each of these conveyors is disclosed as being of a type which positively pushes a truck arriving thereon all the way onto the associated shuttel conveyor. While conveyors for doing this may take various forms, for exemplary purposes, each of these conveyors is preferably provided with a pair of spaced apart and parallel roadway tracks on which the truck rolls and a ram or the like for pushing the truck therealong and off and beyond the exit end thereof onto the associated exit shuttle conveyor.

Exit shuttle conveyor 30 is preferably adapted for supporting and conveying the article supporting trucks sideways, that is, in the right-hand direction according to FIG. 1. This shuttle conveyor must also be capable of having trucks rolled theeron when pushed by the exit transfer out rams. While conveyors for this purpose may take various forms, for exemplary purposes, the exit shuttle conveyor is preferably a slat-type conveyor having a series of slats or flats pivotally connected to one another in series in an endless chain. In this manner, the slats provide a flat surface onto which a truck can be rolled and the conveyor is sectionalized so that it can move around the turns at each end when driven by an electric motor.

All of the aforementioned conveyors are of known types and the details thereof have not been shown to avoid complicating the drawings. While only four storage conveyors have been shown in FIG. 1, any desired number of additional storage conveyors could similarly be arranged between storage conveyors Nos. 2 and 10.

The conveyors of FIG. 1 are also provided with a plurality of limit switches for controlling operation of the system. These limit switches are mounted on the conveyors in the positions shown in FIG. 1 so as to be operated in their proper order. Certain of these limit switches are operated by a portion of the undercarriage of the article supporting trucks as the latter pass thereover and others of these limit switches are operated by the conveyor operating mechanisms. These limit switches and the manner of operating the same will be more fully described in connection with the description of the control system shown in FIGS. 4 through 12.

Storage conveyors Nos. 1, 2, 10 and L are provided with stops ST3, ST4, ST5 and ST6, respectively, at their exit ends. The aforementioned stops are of known construction and the details thereof have not been shown to avoid complicating the drawings.

Exit shuttle conveyor 30 is provided at its right-hand end with a limit stop control device LSC2 for stopping the shuttle conveyor if the article should travel beyond its normal stopping position. Limit stop control device LSC2 is provided with a light source PCL2 and a photocell PC2 for detecting an overshoot condition of the article as more fully hereinafter described.

Figure 2:
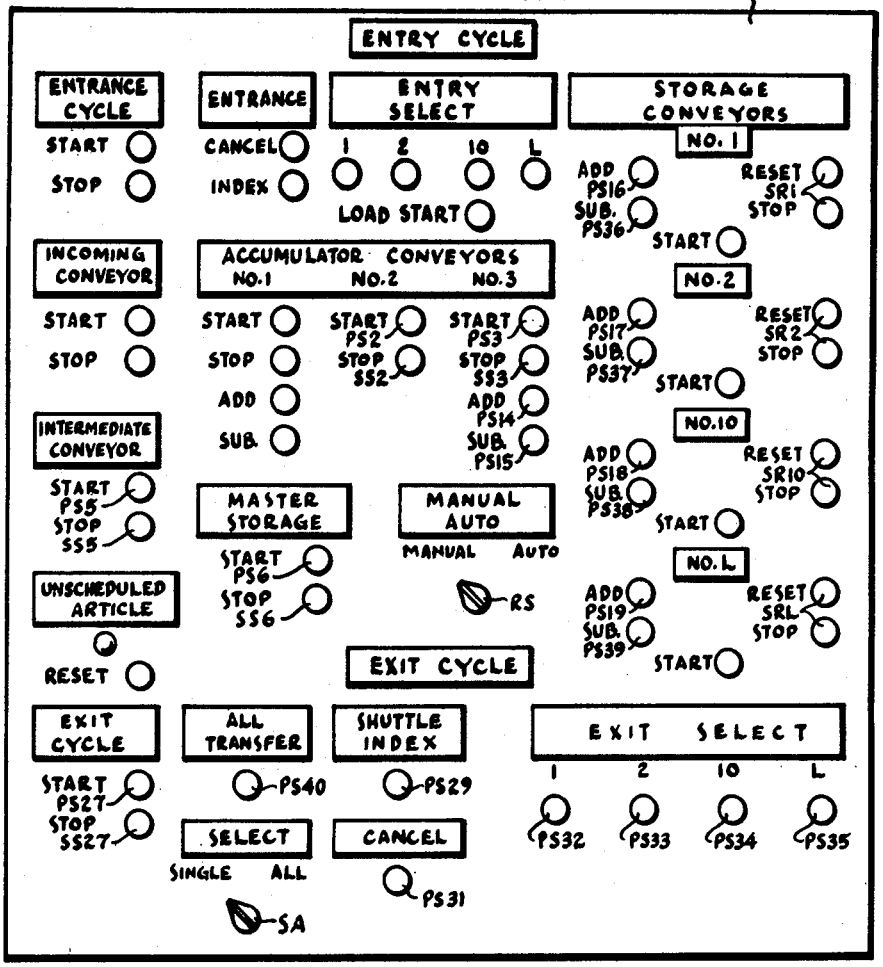
FIG. 2 is an illustration of a main operator's station and control devices thereon.
Figure 3:
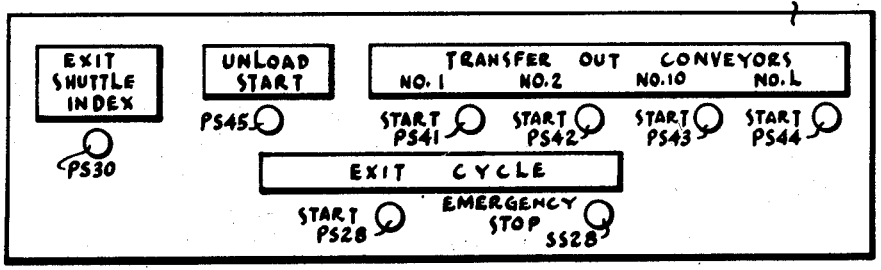
FIG. 3 is an illustration of an exit manual operator's station and control devices thereon.

Referring to FIGS. 2 and 3, there are shown a main operator's station control panel 2 and an exit manual operator's station control panel 4 which are also shown schematically in FIG. 1. These control panels have mounted thereon a plurality of pushbutton and selector devices which are manually controllable by the main and exit operators for causing the system to perform the various control functions hereinafter described.

Control panel 2 is provided with a start switch PS2 and a stop switch SS2 for controlling accumulator conveyor 34 identified also as No. 2 and a start switch PS3 and a stop switch SS3 for controlling accumulator conveyor 38 identified also as No. 3. A start switch PS5 and a stop switch SS5 are provided for controlling intermediate conveyor 36. A start switch PS6 and a stop switch SS6 are provided for controlling the storage conveyors Nos. 1, 2, 10 and L in unison. An add switch PS14 and a subtract switch PS15 are provided for manually operating or positioning the counter of accumulator conveyor No. 3. Add switches PS16, PS17, PS18 and PS19 are provided for manually operating or positioning the counters of storage conveyors Nos. 1, 2, 10 and L, respectively. A selective manual-auto rotary switch RS is provided for transferring the system between manual and automatic operation. A plurality of two-button stop-reset switches SR1, SR2, SR10 and SRL are provided for selectively controlling stopping and starting of the respective storage conveyors Nos. 1, 2, 10 and L, respectively.

At the lower portion of control panel 2 there are provided a plurality of additional control devices for controlling the exit cycle portion of the system, that is for controlling withdrawal of articles from the storage conveyors. An exit cycle start switch PS27 and an exit cycle stop switch SS27 are provided for controlling the exit cycle, that is, for conditioning the system so that withdrawal of articles from the storage conveyors can be selectively initiated. Another start switch PS28 and another stop switch SS28 are provided on exit manual operator's station control panel 4 in FIG. 3 for performing the same functions under manual control as switches PS27 and SS27 are capable of performing under automatic control. A single-all selective rotary switch SA is provided at the lower portion of panel 2 for transferring the system from a condition wherein an article can be withdrawn from a single storage conveyor at a time to a condition wherein one article can be withdrawn from all the storage conveyors at once. Switches PS29 and PS30 are provided on panels 2 and 4, respectively, for manually controlling indexing or movement of exit shuttle conveyor 30 from the two locations. A cancel switch PS31 is provided on panel 2 for controlling cancellation after an exit selection has been made. Exit select switches PS32, PS33, PS34 and PS35 are provided for making exit selections, that is, for initiating withdrawal of articles from storage conveyors Nos. 1, 2, 10 and L, respectively. Subtract switches PS36, PS37, PS38 and PS39 are provided for operating or positioning the counters of the respective storage conveyors. An all transfer switch PS40 is provided for controlling the transfer of articles from all the storage conveyors onto the exit shuttle conveyor. A No. 1 start switch PS41, a No. 2 start switch PS42, a No. 10 start switch PS43 and a No. L start switch PS44 are provided for manually controlling exit transfer-out conveyors 22, 24, 26 and 28, respectively, and the release of articles from the respective storage conveyors. An unload start switch PS45 is provided for controlling unload transfer-off conveyor 32 manually whenever an article is at the exit end of exit shuttle conveyor 30. The circuit connections for the aforementioned pushbutton and selector switches are shown in FIGS. 4 through 12.

Figure 4:
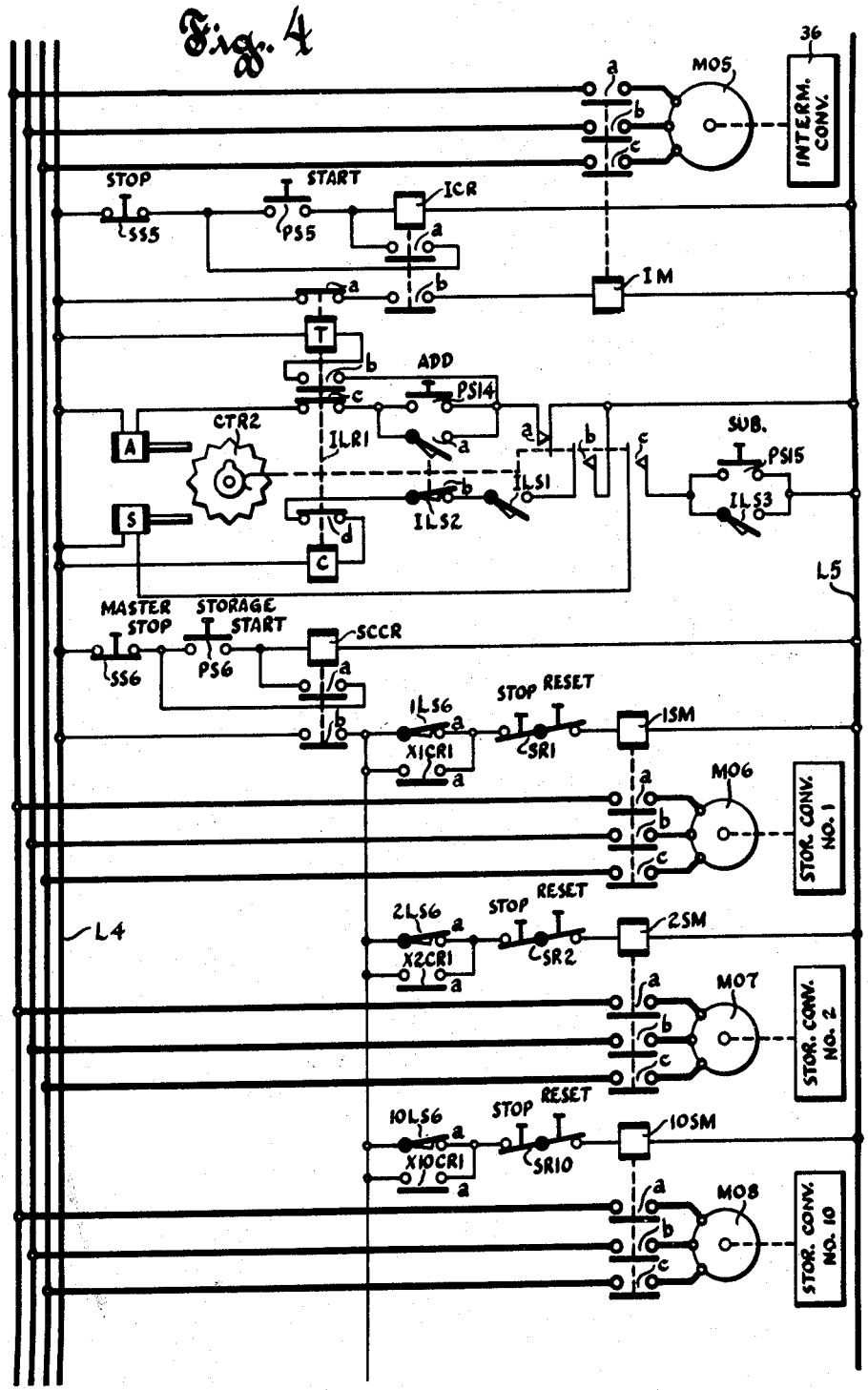
Figure 5:
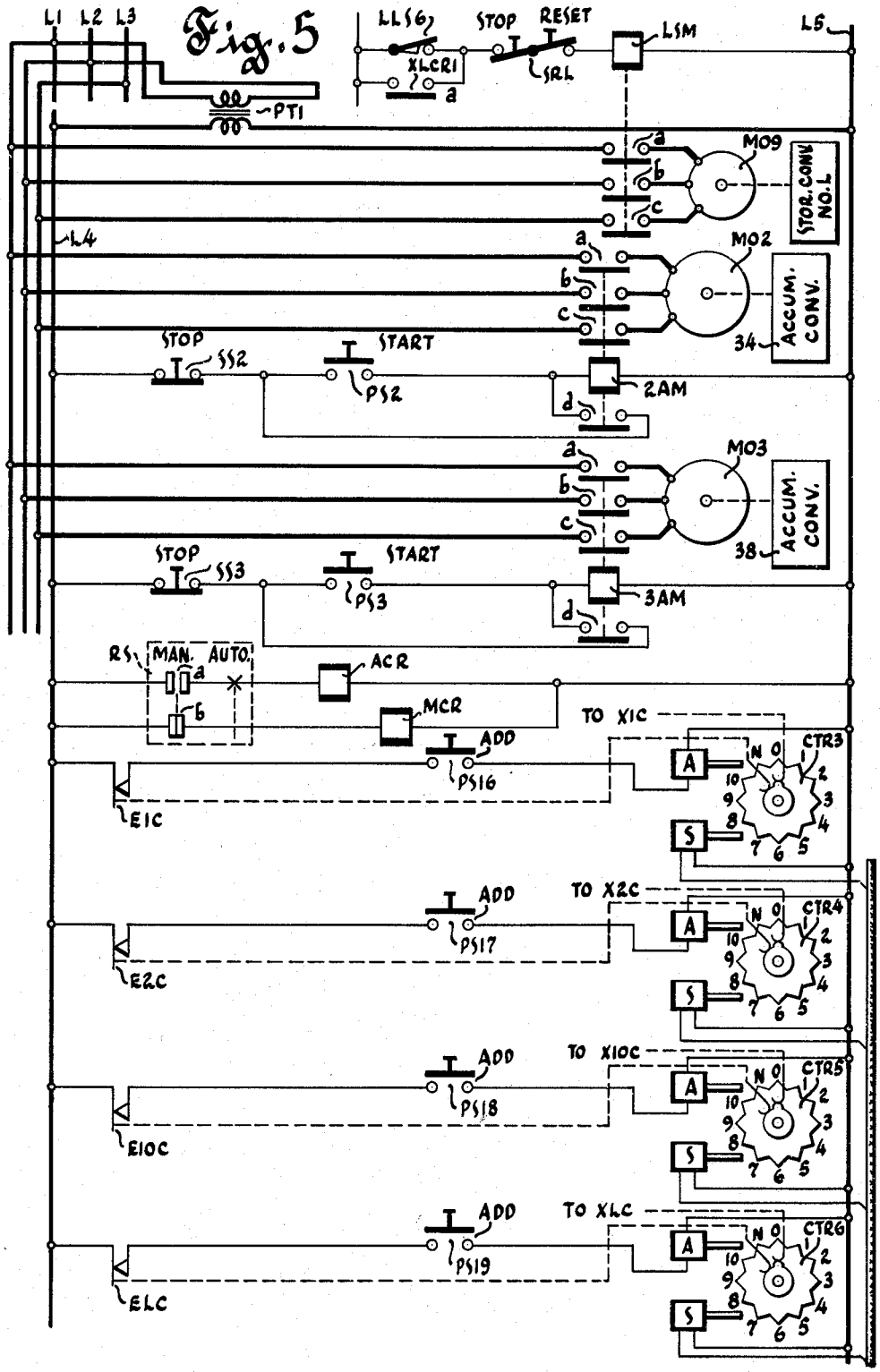

The control circuits for the exit portion of the storage conveyor system of FIG. 1 are shown in FIGS. 4 through 12. Power supply lines L1, L2 and L3 are connectable to a three-phase power supply source. Lines L1 and L2 are connected through a voltage reducing transformer PT1 in FIG. 2 to conductors L4 and L5. There are shown in FIG. 5, motors MO2 and MO3 for driving accumulator conveyors 34 and 38, respectively. Motor MO2 is provided with a start switch PS2 and a stop switch SS2 for controlling a main power contactor 2AM whereby the motor is connected to power supply lines L1, L2 and L3. Likewise, motor MO3 is provided with a start switch PS3 and a stop switch SS3 for controlling a main power contactor 3AM whereby the motor is connected to power supply lines L1, L2 and L3.

An electric motor MO5 shown in FIG. 4, is provided for driving intermediate conveyor 36. Motor MO5 is provided with a start switch PS5 and a stop switch SS5 for controlling an intermediate conveyor control relay 1CR which in turn controls main contactor IM whereby the motor is connected to power supply lines L1, L2 and L3. An add-subtract counter CTR2 in FIG. 4 is provided for counting the number of articles entering and leaving accumulator conveyor 38. Counter CTR2 is provided with an add coil A for stepping the counter in the clockwise direction one step for each article entering accumulator conveyor 38 and a subtract coil S for stepping the counter in the counterclockwise direction one step for each article leaving accumulator conveyor 38. Counter CTR 2 is also provided with switches a, b and c for performing control functions hereinafter described. A control relay 1LR1 having a closing coil C and a tripping coil T and a plurality of contacts is provided for stopping intermediate conveyor 36 when a predetermined number of articles have been accumulated on accumulator conveyor 38 and for restarting the intermediate conveyor when an article is removed from accumulator conveyor 38. Storage conveyors Nos. 1, 2, 10 and L are provided with driving motors MO6, MO7, MO8 and MO9, respectively, shown in FIGS. 4 and 5. Motor MO6 is provided with a stop-reset switch SR1 for controlling its main power contactor 1SM whereby the motor is connected to power supply lines L1, L2 and L3. Similarly, motor MO7 is provided with a stop-reset switch SR2 for controlling its main power contactor 2SM whereby the motor is connected to power supply lines L1, L2 and L3. Similarly, motor MO8 is provided with a stop-reset switch SR10 for controlling its main power contactor 10SM whereby the motor is connected to power supply lines L1, L2 and L3. Likewise, motor MO9 in FIG. 5 is provided with a stop-reset switch SRL for controlling its main power contactor LSM whereby the motor is connected to power supply lines L1, L2 and L3. There are also provided a master start switch PS6 and a master stop switch SS6 in FIG. 4 for controlling the aforementioned storage conveyor motors in unison. A storage conveyor control relay SCCR under the control of the aforementioned master start and stop switches in FIG. 4 is provided for controlling the supply of power to main contactors 1SM, 2SM, 10SM and LSM.

Counters CR3, CTR4, CTR5 and CTR6, in FIG. 5, may be operated to count and maintain a registration of the number of articles on the respective storage conveyors. Each such counter is provided with an add coil A and a subtract coil S for stepping the counter in reverse directions. These counters are also provided with respective self-operated switches E1C, E2C, E10C and ELC for preventing operation thereof when the storage conveyors are full. These counters are further provided with respective switches X1C, X2C, X10C and XLC shown in FIGS. 7 and 8 for controlling the exit select circuits as hereinafter described. A manual-auto rotary switch RS is provided in FIG. 5 for controlling either an automatic control relay ACR or a manual control relay MCR.

In FIG. 4 limit switch 1LS1 controls stopping of intermediate conveyor 36 when a predetermined number of articles have been accumulated on accumulator conveyor 38. Limit switch ILS2 controls add coil A of counter CTR2 to count the number of articles entering accumulator conveyor 38. Limit switch ILS3 controls restarting of intermediate conveyor 36 each time an article is removed from accumulator conveyor 38.

In FIG. 4 there are provided an add switch PS14 and a subtract switch PS15 for stepping counter CTR2 in reverse directions if it should get out of step with the number of articles actually on accumulator conveyor 38. In FIG. 5, there are provided add switches PS16, PS17, PS18 and PS19 for manually controlling the stepping of counters CTR3, CTR4, CTR5 and CTR6 of the respective storage conveyors in the clockwise add direction in the event they should get out of step with the number of articles actually on the storage conveyors.

Figure 6:
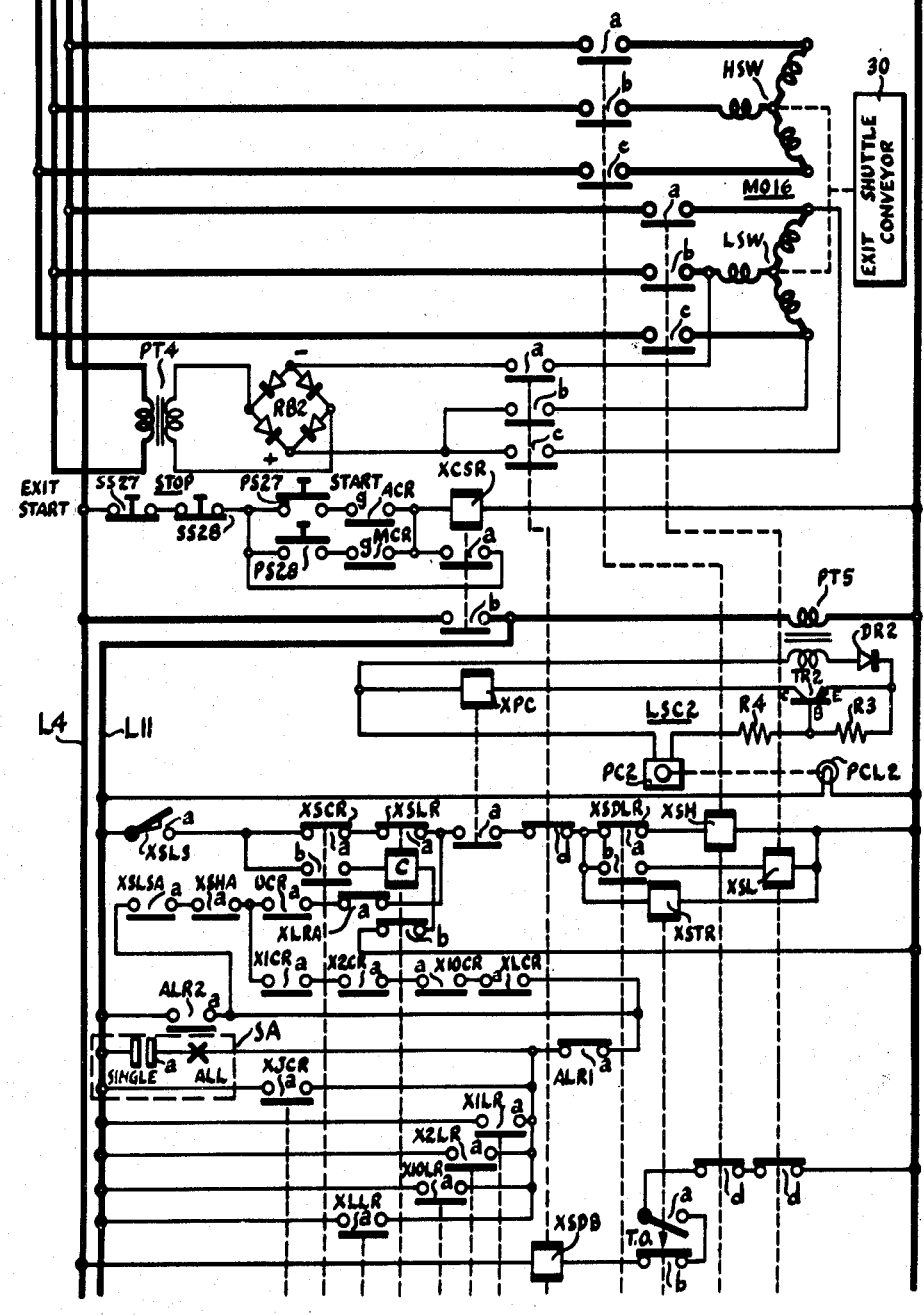

In FIG. 6, there is shown a motor MO16 having high speed winding HSW and low speed winding LSW for operating exit shuttle conveyor 30. A high speed main contactor XSH is provided for connecting windings HSW through lines L1, L2 and L3 to the three-phase power supply source. A low speed main contactor XSL is provided for connecting windings LSW to the power supply lines. A dynamic braking circuit for motor MO16 extends from lines L3 and L2 through a transformer PT4 to the input terminals of a full-wave rectifier bridge RB2 and then from the positive and negative output terminals of bridge RB2 through contacts of a dynamic braking control contactor XSDB to low speed windings LSW.

Limit stop control device LSC2, FIGS. 1 and 6, is supplied from conductors L4 and L5 through a voltage reducing transformer PT5. Device LSC2 comprises a unidirectional conducting device such as a diode DR2, a solid element semi-conductor device such as a transistor TR2, a relay XPC, resistors R3 and R4, a photocell PC2 and a light source such as a lamp PCL2 connected in a manner which will become apparent from the description of operation thereof hereinafter appearing. An exit cycle start relay XCSR under the control of start switches PS27 and PS28 stop switches SS27 and SS28 is provided for conditioning the system so that an exit selection can be made. An exit shuttle timing relay XSTR is provided for controlling dynamic braking contactor XSDB.

Figure 7:
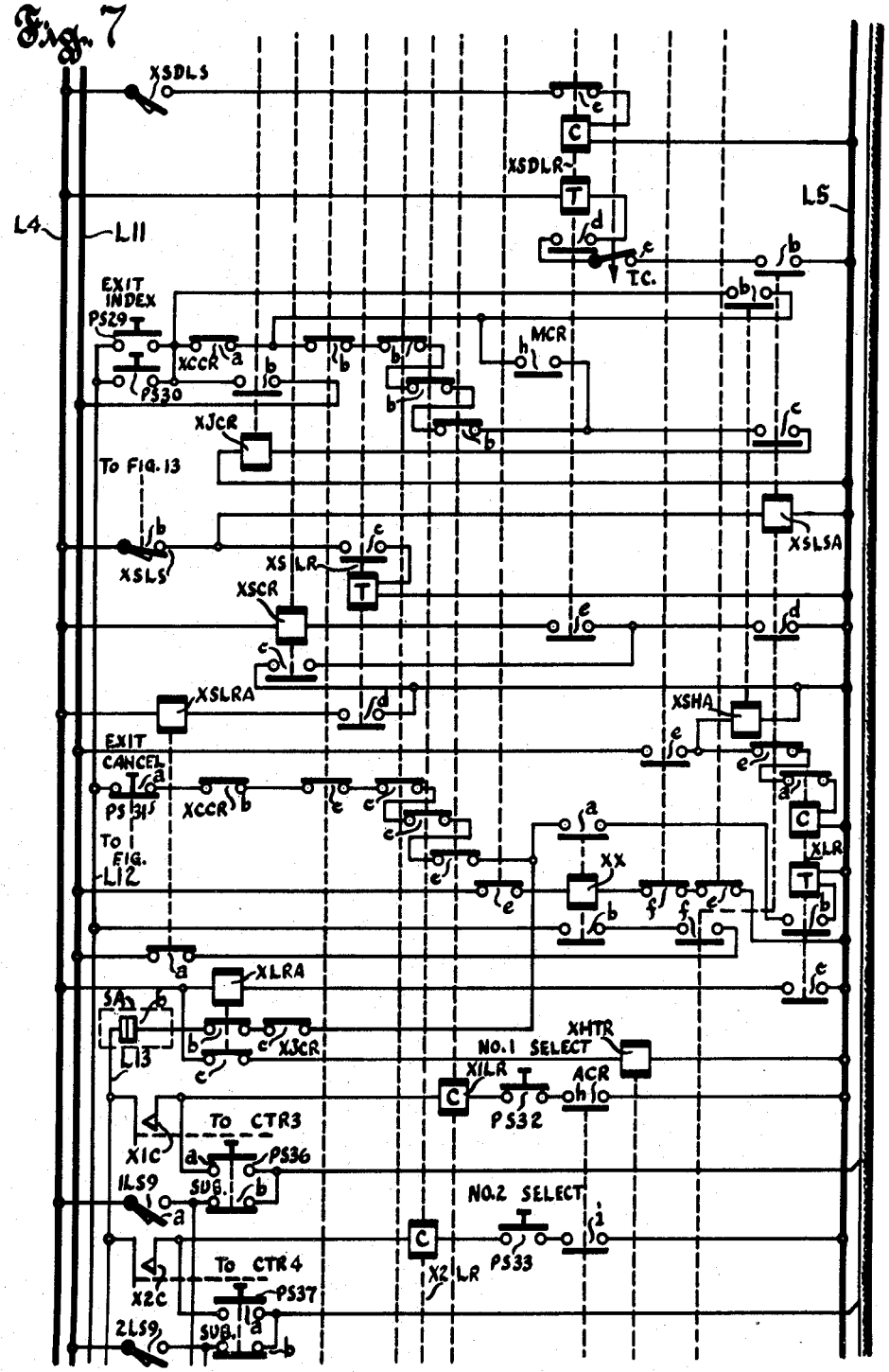
Figure 8:
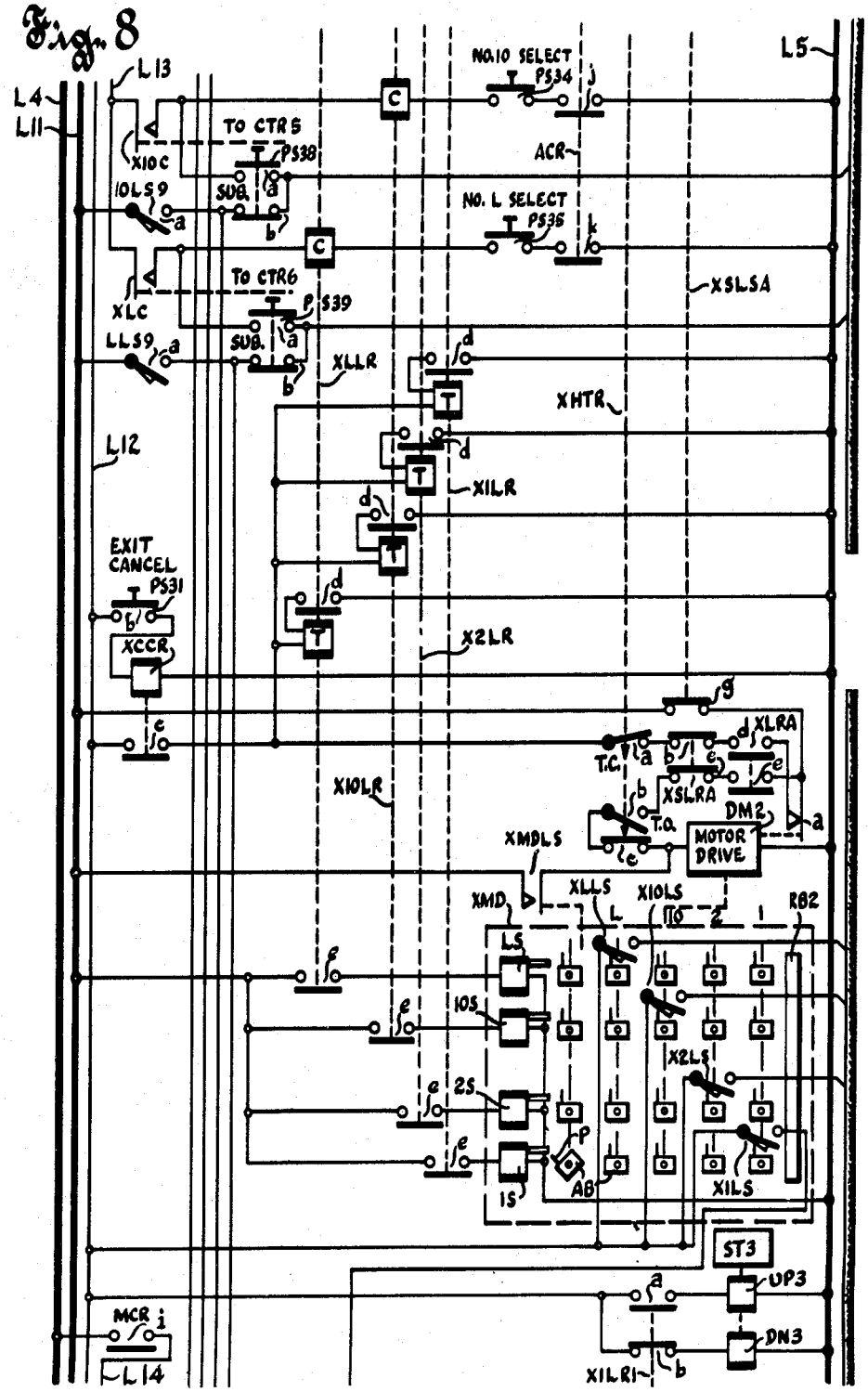

In FIG. 7, a latching relay XSDLR is provided for transferring motor MO16 from high speed to low speed. A control relay XJCR under the control of pushbutton switches PS29 and PS30 affords manual control of indexing the exit shuttle conveyor, that is, movement of the exit shuttle conveyor one space at a time. Such one space of movement of the exit shuttle conveyor is defined as a distance required to move an article from a point directly opposite one storage conveyor to a point directly opposite the next storage conveyor. A relay XSLSA under the control of exit shuttle operated limit switch XSLS is provided for controlling stopping of the exit shuttle conveyor. A latching relay XSLR and relays XSCR and XSLRA are provided for controlling the exit shuttle conveyor in the event it overrides a stopping position. A relay XX is provided for energizing conductor L12 in conjunction with relay XSLSA. A latching relay XLR and a relay XLRA are provided for performing various control functions hereinafter described when the exit shuttle is started. A timing relay XHTR is provided for initiating the operation of drive motor DM2 of exit memory device XMD, and for insuring that device XMD is set before the select relay is tripped. At the lower portion of FIG. 7 and the upper portion of FIG. 8, there are shown a plurality of exit select control relays X1LR, X2LR, X10LR and XLLR under the control of exit select switches PS32, PS33, PS34 and PS35, respectively. Counter switches X1C, X2C, X10C and XLC shown in FIGS. 7 and 8 are operable by counters CTR3, CTR4, CTR5 and CTR6, respectively, to lock out the exit select circuits when the respective storage conveyors are empty. In FIGS. 7 and 8, subtract pushbutton switches PS36, PS37, PS38 and PS39 are connected through the conductors extending along the right-hand sides of FIGS. 5 through 8 to subtract coils S of counters CTR3, CTR4, CTR5 and CTR6, respectively, to afford manual control of operation of these counters in the counter-clockwise direction.

In FIG. 8, an exit cycle cancel relay XCCR under the control of exit cancel switch PS31, the other contact of this switch being shown in FIG. 7, is provided for canceling an exit selection that has been made and being effective only during the time when a previously selected article is being transferred onto the exit shuttle conveyor. Exit memory device XMD is provided with a plurality of stationary solenoids 1S, 2S, 10S and LS, one for each storage conveyor, having actuators for engaging pins P of actuator blocks AB to pivot or set the latter into their operating positions when the memory device starts to rotate. A plurality of limit switches X1LS, X2LS, X10LS and XLLS, one for each storage conveyor, are mounted on stationary supports around the rotary drum which carries the actuator blocks. These limit switches are arranged in the vertical columns and horizontal rows so that a limit switch corresponding to to a given storage conveyor is operable by an actuator block whenever a reserved space on the exit shuttle conveyor reaches a point directly opposite such storage conveyor as hereinafter more fully described. A resetting bar RB2 is provided just ahead of the vertical column of solenoids to reset the actuator blocks in their normal positions. Exit memory device XMD is provided with a number of columns of actuator blocks AB equal to the number of storage conveyors plus 1 for reasons hereinafter described. Stop ST3 in the lower portion of FIG. 8 is provided with an up solenoid UP3 and a down solenoid DN3 for controlling raising and lowering of the stop on storage conveyor No. 1.

In FIG. 9, in addition to the stop shown in FIG. 8, storage line No. 1 is provided with latching relays X1LR1, X1LR2 and X1LR3, control relays 1LS10A, X1CR1 and X1CR and a main contactor X1M for controlling motor MO17 of exit transfer-out conveyor 22. A limit switch 1LS8 is provided for causing stop ST3 to be raised when an article approaches the latter. Limit switch 1LS7 indicates the presence of an article against stop ST3 on storage conveyor No. 1 to permit lowering of stop ST3. Limit switch 1LS6 is operated by stop ST3 to permit starting of exit transfer-out conveyor 22 when the stop is lowered. Limit switch 1LS5 maintains operation of exit transfer-out conveyor 22 until it has completed its cycle of operation. Limit switch 1LS9 having another contact at the lower left-hand portion of FIG. 7 controls subtract coil S of counter CTR3 and performs additional control functions hereinafter described. Limit switch 1LS10 prevents restarting of exit transfer-out conveyor 22 until exit shuttle conveyor 30 has removed the released from the position adjacent storage conveyor No. 1.

In the lower portion of FIG. 9 and the upper portion of FIG. 10, there is shown a control circuit for stop ST4 and exit transfer-out conveyor 24 of storage line No. 2. Similar to that hereinbefore described in connection with storage line No. 1. This control circuit includes stop ST4 and its up solenoid UP4 and down solenoid DN4, latching relays X2LR1, X2LR2, and X2LR3, control relays 2LS10A, X2CR and X2CR1 and main contactor X2M for controlling motor MO18 of exit transfer-out conveyor 24. Limit switches 2LS5, 2LS6, 2LS7, 2LS8, 2LS9 and 2LS10 are provided for performing functions like those described in connection with the limit switches having like suffix numbers in storage line No. 1.

In the lower portion of FIG. 10, there is shown a control circuit for stop ST5 and exit transfer-out conveyor 26 of storage line No. 10 similar to that hereinbefore described. This control circuit includes stop ST5 and its up solenoid UP5 and down solenoid DN5, latching relays X10LR1, X10LR2 and X10LR3, control relays 10LS10A, X10CR and X10CR1 and main contactor X10M for controlling motor MO19 of exit transfer-out conveyor 26. Limit switches 10LS5, 10LS6, 10LS7, 10LS8, 10LS9, and 10LS10 are provided for performing functions like those described in connection with the limit switches having like suffix numbers in storage lines Nos. 1 and 2.

In FIG. 11, there is shown a control circuit for stop ST6 and exit transfer-out conveyor 28 of storage line No. L similar to those hereinbefore described. This control circuit includes stop ST6 and its up solenoid UP6 and down solenoid DN6, latching relays XLLR1, XLLR2, and XLLR3, control relays LLS10A, XLCR and XLCR1 and main contactor XLM for controlling motor MO20 of exit transfer out conveyor 28. Limit switches LLS5, LLS6, LLS7, LLS8, LLS9 and LLS10 are provided for performing functions like those described in connection with the limit switches having like suffix numbers in storage lines Nos. 1, 2 and 10.

At the lower portion of FIG. 11 and the upper portion of FIG. 12, there is shown an all transfer control circuit for controlling transfer of an article from each storage conveyor onto the exit shuttle conveyor at the same time. This circuit includes a counter CTR7 for counting the movements of the exit shuttle conveyor, latching relays ALR1 and ALR2 and a control relay A1CR.

The lower portion of FIG. 12 shows a control circuit for controlling unload transfer-off conveyor 32 when limit switch ULS2 detects the presence of an article at the right-hand end of exit shuttle conveyor 30 at least one space beyond exit transfer-out conveyor 22. This circuit includes latching relays ULR1, ULR2 and ULR3, a control relay UCR and main contactor UM for controlling motor MO21 of unload transfer-off conveyor 32. Limit switch ULS1 maintains operation of motor MO21 until the unload transfer-off conveyor has completed its cycle of operation. Limit switches ULS3, ULS4 and ULS5 perform control functions hereinafter described.

The operation of the system to effect selective withdrawal of articles from the storage conveyors will now be described. The control circuits which perform these functions are shown in FIGS. 4 through 12.

Referring to FIG. 4, let it be assumed that a source of three-phase electrical power is connected to power supply lines L1, L2 and L3 in the upper left-hand portion of FIG. 4. To condition the system for starting, it may be assumed that relays X1LR1, X2LR1, X10LR1 and XLLR1 in the exit control portion of the system in FIGS. 9, 10 and 11 are in their closed condition wherein contacts b, d and e of each such relay are closed and contacts a and c of each such relay are open as shown. Let it further be assumed that relays X1LR3, X2LR3, X10LR3 and XLLR3 in the exit control portion of the system in FIGS. 9, 10 and 11 are in their closed condition wherein contacts b, c and d of each such relay are closed and contacts a and e of each such relay are open, contacts d and e of these relays being shown at the upper portion of FIG. 12.

In the following description, certain contacts of the relays which contacts are not shown connected by broken lines to the relay windings are identified by the associated relay reference character such as ACR in the middle of FIG. 6 and also by the contact reference character such as g.

When power is applied to supply lines L1, L2 and L3, voltage reducing transformer PT1 in FIG. 5 is energized to supply power therethrough to conductors L4 and L5. As a result, relay XSLSA in FIG. 7 is energized. The circuit for relay XSLSA extends through contact b of limit switch XSLS across conductors L4 and L5. Relay XSLSA closes contacts a, b, c, d and f in FIGS. 6 and 7 and opens contacts e and g thereof in FIGS. 7 and 8.

*Automatic Operation*

For automatic operation of the system, the MAN-AUTO selector switch RS in FIG. 5 is turned to its AUTO operating position to close contact a and open contact b. This causes energization of relay ACR across conductors L4 and L5 in FIG. 5 and closure of contact g of relay ACR to close a point in the exit cycle start circuit in FIG. 6. Contacts h, i, j and k close points in the exit cycle select relay circuits, respectively, in FIGS. 7 and 8. Contact m of relay ACR closes a point in the energizing circuit of exit start unload relay ULR1 in FIG. 12.

Pushbutton start switches PS2 and PS3 in FIG. 5 are pressed to start accumulator conveyors 34 and 38 running. Closure of start switch PS2 causes energization of contactor 2AM through stop switch SS2 across conductors L4 and L5. Contactor 2AM closes contacts a, b and c to connect three-phase power to motor MO2 and thereby to start accumulator conveyor 34 running. Contact d of contactor 2AM closes in shunt of start switch PS2 to maintain contactor 2AM energized. In like manner, closure of start switch PS3 causes energization of contactor 3AM through stop switch SS3 across conductors L4 and L5. Contactor 3AM closes contacts a, b and c to connect three-phase power to motor MO3 and thereby to start accumulator conveyor 38 running. Contact d of contactor 3AM closes in shunt of start switch PS3 to maintain contactor 3AM energized.

In FIG. 4, start switch PS5 is pressed to start intermediate conveyor 36 running. Closure of start switch PS5 causes energization of relay 1CR through stop switch SS5 across conductors L4 and L5. Relay 1CR closes contact a in shunt of start switch PS5 to maintain relay 1CR energized. Contact b of relay 1CR closes an energizing circuit for contactor IM through contact a of relay ILR1 across conductors L4 and L5. Contactor IM closes contacts a, b and c to connect three-phase power to motor MO5 and thereby to start intermediate conveyor 36 running. Contact d of contactor IM in FIG. 12 also closes to complete a point in the maintaining circuit for contactor UM which controls unload transfer off conveyor motor MO21.

In FIG. 4, master storage conveyor start switch PS6 is pressed to start all of the storage conveyors running. Closure of start switch PS6 causes energization of storage conveyors control relay SCCR through stop switch SS6 across conductors L4 and L5. Relay SCCR closes contact a in shunt of start switch PS6 to maintain relay SCCR energized. Contact b closes to complete parallel energizing circuits in FIGS. 4 and 5 for contactors 1SM, 2SM, 10SM and LSM across conductors L4 and L5. The circuit for contactor 1SM extends through contact a of No. 1 storage conveyor stop controlled limit switch 1LS6 and stop-reset switch SR1. The circuits for contactors 2SM, 10SM and LSM extend through similar contacts a of limit switches 2LS6, 10LS6 and LLS6 and similar stop-reset switches SR2, SR10 and SRL, respectively, associated with the other storage conveyors.

Contactor 1SM closes contacts a, b and c to connect three-phase power to motor MO6 and thereby to start storage conveyor No. 1 running. Similarly, contactors 2SM, 10SM and LSM each closes its contacts a, b and c to connect three-phase power to motors MO7, MO8 and MO9 and thereby to start storage conveyors Nos. 2, 10 and L, respectively, running.

In FIG. 6, the exit cycle is started by pressing pushbutton switch PS27. Closure of switch PS27 causes energization of exit cycle start relay XCSR through stop switches SS27 and SS28 and contact g of automatic control relay ACR across conductors L4 and L5. Relay XCSR closes contact a thereof to complete a self-maintaining circuit in shunt of switch PS27 and contact g of relay ACR. Relay XCSR also closes contact b thereof to energize the primary winding of transformer PT5 across conductors L4 and L5. Contact b of relay XCSR also connects conductor L4 to conductor L11 to energize the latter.

The aforementioned energization of conductor L11 causes the photocell light source, that is, the lamp PCL2 in FIG. 6 to light. The light impinging on photocell PC2 causes energization of the latter to effect current flow from the right-hand end of the secondary winding of transformer PT5 through unidirectional current conducting diode DR2, resistors R3 and R4 and photocell PC2 to the left-hand of the secondary winding. The voltage drop across resistor R3 is applied to bias emitter E of transistor TR2 positive relative to base B thereof to render the transistor conducting, the latter being of the P–N–P conductivity type or the like. Current flows through emitter E and collector C of transistor TR2 and the operating coil of relay XPC to energize the latter and to close its contact $a$. As will be apparent, contact $a$ closes a point in the energizing circuit of exit shuttle conveyor 30 power contactors XSH and XSL. Relay XX in FIG. 7 energizes in a circuit extending from conductor L11 through contact $e$ of relay XSDB and contacts $f$ and $e$ of contactor XSH and XSL to conductor L5 and closes contact $a$ and $b$ thereof, the latter contact connecting power from conductor L11 through contact $a$ of relay XSLRA and contact $f$ of relay XSLSA to conductor L12.

Energization of conduct L12 causes energization of conductor L13 in FIG. 7 in a circuit extending from conductor L12 through exit cancel switch PS31, contact $b$ of relay XCCR, contacts $c$ of relays X1LR, X2LR, X10LR and XLLAR, contact $c$ of relays XJCR, contact $b$ of relay XLRA and contact $b$ of switch SA to conductor L13.

The aforementioned energization of conductor L12 effects energization of solenoids DN3, DN4, DN5 and DN6 through contacts $b$ of relays X1LR1, X2LR1, X10LR1 and XLLR1, respectively, to cause stops ST3, ST4, ST5 and ST6 or storage conveyors No. 1, 2, 10 and L, respectively, to be lowered. Relay XHTR in FIG. 7 energizes in a circuit extending from conductor L4 through contact $c$ of relay XLRA to conductor L5. Relay XHTR opens contacts $a$ and $c$ and closes contact $b$, contact $a$ thereof being of the timed closing type as indicated by T.C. adjacent thereto and contact $b$ being of the timed opening type as indicated by T.O. adjacent thereto. Relays X1CR1, X2CR1, X10CR1 and XLCR1 energize across conductors L11 and L5. As a result, contacts $a$ of relays X1CR1, X2CR1, X10CR1 XLCR1 in FIGS. 4 and 5 close to complete points in the energizing circuits of power contactors 1SM, 2SM, 10SM and LSM, respectively, of the storage conveyor motors. Relays X1CR, X2CR, X10CR and XLCR energize across conductors L12 and L5 and close their contacts $a$ in FIG. 6. The circuit for relay X1CR extends through limit switch 1LS9 in FIG. 9, contact $c$ of relay X1LR3 and contact $d$ of relay X1LR2. The circuit for relay X2CR extends through limit switch 2LS9, contact $c$ of relay X2LR3 and contact $d$ of relay X2LR2. The circuit for relay X10CR extends through limit switch 10LS9, contact $c$ of relay X10LR3 and contact $d$ of relay X10LR2. The circuit for relay XLCR extends through limit switch LLS9, contact $c$ of relay XLLR3 and contact $d$ of relay XLLR2. Relay UCR in FIG. 12 energizes through contact $b$ of limit switch ULS2 and contact $c$ of relay ULR1 across conductors L11 and L5 and closes contact $a$ in FIG. 6 in the circuit of the exit shuttle conveyor main contactors XSH and XSL.

The stored articles are accumulated against a stop on each storage conveyor. When a given storage conveyor is full, a counter locks out the operating circuit of its add coil so that it cannot be energized until such time as at least one article is withdrawn therefrom.

An operator at main operator's station 2 withdraws articles from the storage conveyors to a production line through an outgoing conveyor 40. This is done by pressing appropriate exit select pushbutton switches at the main operator's station. Pressing any such exit select switch causes a space immediately on the left side of the space opposite storage conveyor No. L to be reserved for theh article on exit shuttle conveyor 30. The exit shuttle conveyor 30 then moves one space to position the reserved space opposite storage conveyor No. L and exit memory device XMD moves one step to indicate and register the location of the first selected article. When the reserved space on exit shuttle conveyor 30 reaches a point apposite the storage conveyor from which an article was selected, an article is automatically moved into such reserved space on the exit shuttle conveyor by the corresponding exit transfer out conveyor 22, 24, 26 or 28.

As each additional article is reserved or marked for withdrawal, the aforedescribed operations are repeated and successive spaces are reserved. As a result, the articles are arranged on the exit shuttle conveyor in the order in which they are selected for movement through the outgoing conveyor. When the first and each succeeding article reaches the exit end of shuttle conveyor 30 at least one space beyond transfer-out conveyor 22, unload transfer-off conveyor 32 is activated to move the article onto accumulator conveyor 34. As the latter is running continuously, it moves the articles to an idling point at intermediate conveyor 36.

The function of accumulator conveyor 38 is to gather the articles received from the intermediate conveyor and thereby to eliminate any spaces therebetween. Accumulator conveyor 38 is provided with a counter which stops the intermediate conveyor when a predetermined number of articles have been accumulated and restarts the intermediate conveyor when this number is reduced. This action prevents pileups of articles at this location. The articles travel from accumulator conveyor 38 through outgoing conveyor 40 to a production line or the like.

The aforementioned functions will now be described in detail.

An article moving along storage conveyor No. 10, for example, engages limit switch 10LS8 in FIG. 10 to close the same and energize tripping coil T of relay X10LR1 through contact $d$ of the latter. Relay X10LR1 closes contact $a$ to energize up-solenoid UP5 and to raise stop ST5. As a result, the article is stopped and stored on storage conveyor No. 10 although the latter runs continuously. Relay X10LR1 also opens its contact $b$ to deenergize down solenoid DN5 and permit the stop to be raised, closes contact $c$ in the circuit of its closing coil C, opens its contact $d$ to deenergize its tripping coil T and opens its contact $e$ in the circuit of tripping coil T of relay X10LR3. Opening of contact $e$ of relay X10LR1 also prevents operation of closing coil C of relay X10LR2 thereby to prevent operation of transfer-out conveyor 26 until an exit selection has been made as hereinafter described.

When the article engages stop ST5 on storage conveyor No. 10, it engages limit switch 10LS7 to close the same in FIG. 10 to complete a point in the circuit of closing coil C of relay X10LR1. This closure of limit switch 10LS7 is indicative of the presence of at least one article on storage conveyor No. 10 and permits withdrawal of such article under the control of exit memory device XMD when an exit selection is made as hereinafter described. It will be apparent that unless an article is present on the storage conveyor and limit switch 10LS7 is closed thereby, exit transfer-out conveyor 26 cannot be started.

An article stored on storage conveyor No. 1 travels along storage conveyor No. 1 and engages and closes limit switch 1LS8 in FIG. 9 to trip relay X1LR1 and raise stop ST3 at the exit end of the storage conveyor No. 1 and engages and closes limit switch 1LS7 in FIG. 9 to prepare for release of articles from storage conveyor No. 1. Limit switch 1LS6 opens when stop ST3 is raised. In a similar manner, when articles are introduced onto the other storage conveyors, stops ST4, ST5 and ST6 are raised to hold the articles in storage until it is desired to withdraw articles therefrom. The system now remains in this condition with the articles resting against the stops at the exit ends of the storage conveyors until an exit selection is made to initiate withdrawal of an article therefrom as hereinafter described.

Exit Cycle

Let it be assumed that at least one article has been stored on each storage conveyor and that it is desired to withdraw articles therefrom onto exit shuttle conveyor 30 and then convey these articles along transfer-off conveyor 32, accumulator conveyor 34, intermediate conveyor 36 and accumulator conveyor 38 to outgoing conveyor 40 and along the latter to a production line or the like.

It will be recalled from the above description that storage conveyors Nos. 1, 2, 10 and L have been started and run continuously. As a result, the articles stored on these conveyors rest against stops ST3, ST4, ST5 and ST6, respectively. The articles resting against these stops actuate limit switches 1LS7, 2LS7, 10LS7 and LLS7 in FIGS. 9, 10 and 11 to close the same. These stops being in their raised positions, limit switches 1LS6, 2LS6, 10LS6 and LLS6 in FIGS. 9, 10 and 11 are open. It will also be recalled from the above description that accumulator conveyors 34 and 38 are running continuously and that intermediate conveyor 36 is running. Relays X1LR1, X2LR1, X10LR1 and XLLR1 are tripped and relays X1LR3, X2LR3, X10LR3 and XLLR3 are assumed to be initially in their closed conditions with their contacts in the positions shown. Relays XSLSA and ACR are energized.

When the exit cycle was started by pressing switch PS27 in FIG. 6, relays XCSR, XPC, XX, XHTR, X1CR, X2CR, X10CR, XLCR, X1CR1, X2CR1, X10CR1, XLCR1 and UCR energized. Relays X1LR1, X2LR1, X10LR1 and XLLR1 were tripped as hereinbefore described when articles entered the respective storage conveyors. This caused energization of up solenoids UP3, UP4, UP5 and UP6 to maintain storage conveyor stops ST3, ST4, ST5 and ST6 in their raised positions.

Let it be assumed that it is desired to withdraw an article from storage conveyor No. 1. For this purpose, select switch PS32 is pressed. Pressing of exit select switch PS32 in FIG. 7 completes an energizing circuit from conductor L13 through switch X1C of counter CTR3, closing coil C of select relay X1LR and contact h of relay ACR to conductor L5. Relay X1LR closes its contact a in FIG. 6 to energize contactor XSH and relay XSTR, opens its contact b in FIG. 7 in the circuit of relay XJCR, opens its contact c to disconnect power from conductor L13 thereby to lock out the select circuits and to deenergize its closing coil C, closes its contact d in FIG. 8 in the circuit of its tripping coil T and closes its contact e to energize solenoid 1S of exit memory device XMD. The circuit for contactor XSH extends from conductor L11 through contacts a of relays X1LR, ALR1, XLCR, X10CR, X2CR, X1CR, UCR, XLRA, XPC and XSDLR and contact d of contactor XSDB.

Energization of contactor XSH causes closure of its contacts a, b and c to connect high speed winding HSW of motor MO16 to the three-phase source and to start exit shuttle conveyor 30 running at a high speed. Contactor XSH also opens its contact d to prevent energization of dynamic braking contactor XSDB at this time, closes its contact e in FIG. 7 to energize relay XSHA and to complete a point in the circuit of closing coil C of relay XLR, and opens its contact f to deenergize relay XX.

Relay XSTR closes timed opening contact a, opens contact b and opens timed closing contact c in FIG. 7. Solenoid 1S in the lower portion of FIG. 8 upon being energized operates its actuator to prepare the same, when device XMD starts to rotate, to act upon pin P of actuator block AB at the left end, that is, in the column before column L of the lower row of actuator blocks to pivot the latter and thereby to prepare the same for closure of limit switch X1LS when it engages the latter as hereinafter described. Relay XSHA closes its contact a in FIG. 6 to complete a maintaining circuit for contactor XSH to maintain the exit shuttle conveyor running. This circuit extends also through contact a of relay XSLSA in shunt of contacts a of relays X1CR, X2CR, X10CR and XLCR. Relay XSHA also closes its contact b in the manually operable exit shuttle index circuit in the upper portion of FIG. 7. Relay XX open its contact a in the circuit of tripping coil T of relay XLR and opens its contact b to lock out the select circuits by deenergizing conductors L12 and L13.

When exit shuttle conveyor 30 starts running, it disengages limit switch XSLS in FIG. 6 to complete a second maintaining circuit at its contact a for main contactor XSH through contacts a of relays XSCR, XSLR, XPC and XSDLR and contact d of contactor XSDB. Limit switch XSLS remains closed until the exit shuttle conveyor has moved one space whereupon limit switch XSLS is re-engaged to stop the exit shuttle conveyor. Contact b of limit switch XSLS in FIG. 7 opens to deenergize relay XSLSA.

Relay XSLSA opens its contact a in FIG. 6 to interrupt the first mentioned maintaining circuit of contactor XSH, opens its contact b in the circuit of tripping coil T of relay XSDLR, opens its contact c to lock out the manual index circuit in FIG. 7, opens its contact d to lockout relay XSCR, closes its contact e to energize closing coil C of relay XLR, opens its contact f to maintain the select circuits locked out, closes its contact g in FIG. 8 in the circuit of driving motor DM2 of exit memory device XMD, and opens its contact h in FIG. 11 to prevent energization of closing coil C of relay ALR1.

Relay XLR in FIG. 7 opens its contact a to deenergize its closing coil C, closes its contact b in the circuit of its tripping coil T and closes its contact c to energize relay XLRA. Relay XLRA opens its contact a in FIG. 6 in the original energizing circuit of contactor XSH, opens its contact b in FIG. 7 to maintain the select circuits deenergized, opens its contact c to deenergize relay XHTR, closes its contact d in FIG. 8 in the circuit of tripping coils T of select relays X1LR, X2LR, X10LR and XLLR, and closes its contact e in FIG. 8 in the circuit of drive motor DM2 of exit memory device XMD.

Relay XHTR closes its contact c in FIG. 8 to energize driving motor DM2 to rotate exit memory device XMD one step in the direction of the arrow. When exit memory device XMD starts to rotate, its limit switch XMDLS closes a maintaining circuit for its drive motor DM2. Limit switch XMDLS maintains operation of drive motor DM2 until exit memory device XMD reaches its next operating position whereupon limit switch XMDLS is opened thereby to stop its rotation. After a predetermined time interval sufficient for limit switch XMDLS to have closed the aforementioned maintaining circuit, timed opening contact b of relay XHTR opens to interrupt the original energizing circuit of drive motor DM2. When drive motor DM2 starts to rotate exit memory device XMD, its switch a is opened to prevent tripping of select relay X1LR and remains open until the memory device reaches its next operating position. When exit memory device XMD starts to rotate, pin P of the first actuator block AB in the first column thereof engages the actuator member of solenoid 1S to pivot or set the actuator block counterclockwise into its angular position. After the aforementioned time interval, timed closing contact a of relay XHTR closes. It will be apparent that contacts b and c of timing relay XHTR initiate operation of the exit memory device. Contact a of relay XHTR prevents tripping of the closed select relay until exit memory device and XMD starts rotating. When the exit memory device reaches its operating position 2, switch a recloses to energize tripping coil T of relay X1LR. Relay X1LR restores its contacts to the positions shown in FIGS. 6, 7 and 8, its contact e interrupting energization of solenoid 1S of exit memory device XMD.

The aforementioned pivoting of the actuator block of exit memory device XMD constituted a reservation of a space on the exit shuttle conveyor for an article to be received from storage conveyor No. 1. The space that is reserved each time a select switch is pressed is the space that is opposite storage conveyor No. L after the exit shuttle conveyor has moved one space. When a sufficient number of selections have been made so that this reserved space reaches the selected storage conveyor, an article is withdrawn therefrom onto the exit shuttle conveyor in the manner hereinafter described.

When exit shuttle conveyor 30 approaches the end of its one-space movement, it engages limit switch XSDLS at the upper left-hand portion of FIG. 7 to close the same. As a result, closing coil C of relay XSDLR is energized through contact c of the latter. Relay XSDLR opens its contact a to deenergize contactor XSH and closes its contact b to energize contactor XSL. As a result, high speed winding HSW is disconnected and low speed winding LSW of motor MO16 is connected to the three-phase source to reduce the speed of exit shuttle conveyor 30. Relay XSDLR also opens contact c to deenergize its closing coil C, closes contact d in the circuit of its tripping coil T and closes contact e in the circuit of relay XSCR. Exit shuttle conveyor 30 then reengages limit switch XSLS to open contact a and to close contact b of the latter. Contact a of limit switch XSLS deenergizes contactor XSL and relay XSTR and contact b thereof energizes relay XSLSA. Contactor XSL restores its contacts to the positions shown in FIGS. 6 and 7.

Relay XSTR closes its contact b to energize dynamic braking contactor XSDB through contact a of relay XSTR and contacts d of contactors XSH and XSL.

Contactor XSDB closes its contacts a, b and c to connect direct current to low speed windings LSW of motor MO16 to dynamically brake the motor and to stop the exit shuttle conveyor. Contactor XSDB also opens its contact d to prevent energization of contactors XSH and XSL and opens its contact e to prevent energization of relay XX.

Relay XSTR opens its contact a after a predetermined time interval sufficient to allow stopping of motor MO16 under dynamic braking thereby to deenergize contactor XSDB and restore its contacts to the positions shown. Contact e of contactor XSDB energizes relay XX through contacts f and e of contactors XSH and XSL, respectively. Relay XX closes contact a to energize tripping coil T of relay XLR in a circuit extending through contact b of the latter, contacts c of select relays X1LR, X2LR, X10LR and XLLR, contact b of relay XCCR and cancel switch PS31. Relay XLR at contact c deenergizes relay XLRA to cause the contacts of the latter to restore to the positions shown in FIGS. 6 and 7.

The aforementioned energization of relay XSLSA causes closure of its contact a in FIG. 6, closure of its contact b in the circuit of tripping coil T of relay XSDLR, closure of its contact c, closure of its contact d to energize relay XSCR, opening of its contact e, closure of its contact f and opening of its contact g in FIG. 8.

Relay XSCR opens its contact a in FIG. 6, closes its contact b in the circuit of closing coil C of relay XSLR, and closes its contact c in shunt of contact d of relay XSLSA to maintain itself energized. A predetermined time interval after deenergization of relay XSTR as aforedescribed, contact c thereof closes to energize tripping coil T of relay XSDLR. Relay XSDLR restores its contacts to the positions shown, its contact e deenergizing relay XSCR.

It will be apparent that relay XSCR was energized and deenergized without effect as described above. Relay XSCR is provided to control the system in the event the exit shuttle conveyor overrides limit switch XSLS as hereinafter described. If limit switch XSLS is overridden, relay XSDLR will not trip because contact b of relay XSLSA reopens. Closing coil C of relay XSLR in FIG. 6 will energize through contact a of limit switch XSLS, contact b of relay XSCR and contact b of relay XSLR. Contact d of relay XSLR will energize relay XSLRA. Relay XSLR will open contact a to stop the exit shuttle conveyor, open contact b to deenergize its closing coil C and close contact c in the circuit of its tripping coil T. Relay XSLRA will open its contact a to lock out the closing coils C of the select relays by deenergizing conductors L12 and L13, open its contact b in FIG. 8 to lock out tripping coils T of the select relays and open its contact c in FIG. 8 to lock out drive motor DM2 of the exit memory device. This will prevent operation of the system until the exit shuttle conveyor is repositioned to its proper position causing actuation of limit switch XSLS.

The system operates in the manner hereinbefore described each time a select switch is pressed. That is, the exit memory device is operated to reserve a space on the exit shuttle conveyor and the exit shuttle conveyor is operated to move one space in the right-hand direction as seen in FIG. 1.

When sufficient selections have been made so that the space reserved on the exit shuttle conveyor for an article to be withdrawn from storage conveyor No. 1 reaches a point directly opposite the latter, exit memory device XMD will also have been rotated or stepped in unison with the exit shuttle conveyor movements to a position wherein the pivoted actuator block AB in the lower row thereof engages and closes limit switch X1LS in FIG. 8. Limit switch 1LS7 in FIG. 9 having been closed by an article resting against stop ST3, closing coil C of relay X1LR1 is energized in a circuit extending from conductor L12 in FIG. 8 through limit switches X1LS, 1LS7 and 1LS10, a contact a of relay X1LR2 in FIG. 9, contact c of relay X1LR1 and closing coil C to line L5.

Relay X1LR1 opens contact a to deenergize up solenoid UP3 and closes contact b to energize down solenoid DN3 to lower stop ST3 of storage conveyor No. 1 to release an article from the latter. Relay X1LR1 also opens contact c to deenergize its closing coil C, closes contact d in the circuit of its tripping coil T and closes its contact e in the circuit of closing coil C of relay X1LR2.

When stop ST3 reaches its lower position, it engages and closes limit switch 1LS6 in FIG. 9, to energize closing coil C of relay X1LR2 in a circuit extending from limit switch 1LS10 through contact e of relay X1LR1 and contact b of relay X1LR2. As storage conveyor No. 1 runs continuously, lowering of the stop also causes an article to be moved onto exit transfer out conveyor 22. Closure of limit switch 1LS6 also causes energization of tripping coil T of relay X1LR3 through contact b of the latter, contact b of relay 1LS10A and contact e of relay X1LR1 to limit switch 1LS6. Limit switch 1LS7 opens.

Relay X1LR2 opens contact a in the circuit of closing coil C of relay X1LR1, opens contact b to deenergize its closing coil C, closes contact c in the circuit of its tripping coil T, opens contact d to deenergize relay X1CR and closes contact e to energize main contactor X1M across conductors L12 and L5. Relay X1LR3 closes contact a in the circuit of its closing coil C, opens contact b to deenergize its tripping coil T and opens contact c in the circuit of relay X1CR.

Relay X1CR opens its contact a in FIG. 6 to lock out and prevent operation of exit shuttle conveyor 30. Contactor X1M closes its contacts a, b and c to connect motor MO17 to the three-phase power supply source to start exit transfer-out conveyor 22 running. When exit transfer-out conveyor 22 starts moving, it disengages limit switch 1LS5 to cause the latter to close and complete a maintaining circuit for contactor X1M. When the ram of transfer-out conveyor 22 moves the article over exit shuttle conveyor 30, it engages limit switch 1LS9 to close contact *a* thereof in FIG. 7 and to open contact *b* thereof in FIG. 9. Contact *a* of limit switch 1LS9 energizes subtract coil S of counter CTR3 at the lower right-hand portion of FIG. 5, the circuit therefore extending through contact *b* of pushbutton switch PS36, and the conductor extending along the right-hand sides of FIGS. 5 through 8. As a result, counter CTR3 is stepped one step in the counterclockwise direction to register the withdrawal of one article from storage conveyor No. 1. Contact *b* of limit switch 1LS9 in FIG. 9 maintains relay X1CR deenergized. Contact *a* of limit switch 1LS9 also energizes tripping coil T of relay X1LR2 through contact *c* of the latter. Relay X1LR2 closes contacts *a*, *b* and *d* and opens contacts *c* and *e*.

As storage conveyor No. 1 moves the article onto exit transfer-out conveyor 22, the next article engages limit switch 1LS8 in FIG. 9 to energize tripping coil T of relay X1LR1 through contact *d* of the latter. Relay X1LR1 opens contact *b* to deenergize down solenoid DN3 and closes contact *a* to energize up solenoid UP3 to raise stop No. 1 and to stop the next article. Relay X1LR1 also closes contact *c* and opens contacts *d* and *e*. Raising of the stop causes limit switch 1LS6 to reopen.

When the first article reaches its position on exit shuttle conveyor 30, it engages limit switch 1LS10 in FIG. 9 to open contact *a* and to close contact *b* thereof. Contact *a* of limit switch 1LS10 prevents operation of closing coil C of relay X1LR1 and contact *b* thereof energizes relay 1LS10A. Relay 1LS10A closes contact *a* to energize closing coil C of relay X1LR3, opens contact *b* in the circuit of tripping coil T of relay X1LR3 and closes contact *c* in FIG. 12 in the circuit of closing coil C of relay ALR2. Relay X1LR3 opens contact *a* to deenergize its closing coil C, closes contact *b* in the circuit of its tripping coil T, closes contact *c* to energize relay X1CR, closes its contact *d* in FIG. 12 and opens its contact *e*. Relay X1CR closes its contact *a* in FIG. 6 to prepare the exit shuttle conveyor for operation.

When transfer-out conveyor 22 has completed its cycle of operation, it reengages limit switch 1LS5 to open the same and to deenergize contactor X1M. As a result, motor MO17 is disconnected from the power supply source to stop transfer-out conveyor 22.

When another exit selection has been made causing movement of exit shuttle conveyor 30 one space in the right-hand direction and movement of such first article to the right-hand end of the exit shuttle conveyor into registration with unload transfer off conveyor 32 as shown in FIG. 1, the article that was withdrawn from storage conveyor No. 1 engages limit switch ULS2 in FIG. 12 to close contact *a* and to open contact *b* thereof. Contact *a* of limit switch ULS2 energizes closing coil C of relay ULR1 through contact *m* of relay ACR, contact *a* of relay ULR2 and contact *a* of relay ULR1. Contact *b* of limit switch ULS2 deenergizes relay UCR.

Relay UCR opens its contact *a* in FIG. 6 to lock out the exit shuttle conveyor drive circuit. Relay ULR1 opens contact *a* to deenergize its closing coil C, closes its contact *b* in the circuit of its tripping coil T, opens its contact *c* to maintain relay UCR deenergized and closes its contact *d* to energize main contactor UM. The circuit of contactor UM extends through contact *e* of relay ULR2 and contact *d* of relay ULR1 and then in parellel through contact *d* of relay ULR3 and contact *d* of intermediate conveyor motor main contactor IM. Contactor UM closes contact *a* in its maintaining circuit and closes contacts *b*, *c* and *d* to connect motor MO21 to the three-phase power supply source thereby to start transfer-off conveyor 32 running.

When transfer-off conveyor 32 starts moving, it disengages limit switch ULS1 in FIG. 12 to cause closure thereof and to complete a maintaining circuit for contactor UM through contact *a* of the latter and then in parallel through contact *d* of relay ULR3 and contact *d* of contactor IM. Limit switch ULS1 maintains contactor UM energized until the transfer-off conveyor has completed its cycle of operation and reengages limit switch ULS1 to open the same and deenergize contactor UM to stop the transfer-off conveyor.

When the article moves along transfer-off conveyor 32, it engages limit switch ULS3 in FIG. 12 to energize closing coil C of relay ULR2. Relay ULR2 opens contact *a* in the circuit of closing coil C of relay ULR1, closes contact *b* to energize tripping coil T of relay ULR1 through contact *b* of the latter and limit switch ULS3, opens contact *c* to deenergize its closing coil C, closes contact *d* in the circuit of its tripping coil T, opens contact *e* to interrupt the original energizing circuit of contactor UM and closes contact *f* in shunt of contacts *d* of relay ULR3 and contactor IM, respectively. Limit switch ULS2 is disengaged to open contact *a* and to close contact *b* thereof.

Accumulator conveyor 34 runs continuously and moves the article from unload transfer-off conveyor 32 toward intermediate conveyor 36. The article engages limit switch ULS4 to energize closing coil C of relay ULR3 through contact *b* of the latter. Relay ULR3 closes contact *a* to energize tripping coil T of relay ULR2 through contact *d* of the latter and limit switch ULS4, opens contact *b* to deenergize its closing coil C, closes contact *c* in the circuit of its tripping coil T and opens contact *d* in the original energizing circuit of contactor UM. Relay ULR2 restores its contacts to the positions shown in FIG. 12.

The article travels from accumulator conveyor 34 over the aforementioned idle portion onto intermediate conveyor 36 and closes and reopens limit switch ULS5 to trip relay ULR3. Also, when unload transfer-off conveyor 32 has completed its cycle of operation and returns to its normal position, it reengages limit switch USL1 to open the same. As a resclt, limit switch ULS1 deenergizes contactor UM to stop the unload transfer-off conveyor. Contact *d* of contactor IM maintains contactor UM energized until relay ULR2 is tripping and relay ULR3 is closing.

If exit select switch PS33 at the lower portion of FIG. 7 is pressed, the system operates in the manner hereinbefore described except that the circuit elements associated with storage conveyor No. 2 operate instead of the circuit elements associated with storage conveyor No. 1. For example, solenoid 2S of exit memory device XMD in FIG. 8 pivots the actuator block AB then adjacent the solenoid to reserve a space on exit shuttle conveyor 30. And when sufficient selections have been made, the article is released from storage conveyor No. 2 and moved onto the exit shuttle conveyor under the control of the circuit shown in the lower portion of FIG. 9 and the upper portion of FIG. 10.

The system operates in a similar manner when switches PS34 and PS35 at the upper portion of FIG. 8 are pressed to withdraw articles from storage conveyors Nos. 10 and L. In each case, the exit shuttle conveyor moves one space in the right-hand direction as shown in FIG. 1 and exit memory device XMD is stepped once to retain a memory of the reserved space.

Select All

If it is desired to selet an article from all of the storage conveyors, select all switch SA, portions of which are shown in FIGS. 6, 7 and 11, is turned from its SINGLE operating position to its ALL operating position wherein contacts *a* and *c* are closed and contacts *b* and *d* are opened. As a result, contactor XSH is energized in a circuit extending from conductor L11 in FIG. 6 through contact *a* of switch SA, contact *a* of relay ALR1, contacts *a* of relays XLCR, X10CR, X2CR, X1CR, UCR, XLRA, XPC and XSDLR and contact *d* of contactor SXDB to conductor L5. This causes operation of exit shuttle conveyor 30 as hereinbefore described. When the exit shuttle starts, limit switch XSLS operates relay XSLSA in FIG. 7 as hereinbefore described. Relay XSLSA closes its cotact *h* in FIG. 11 in the circuit of closing coil C of relay ALR1. Exit memory device XMD in FIG. 8 is stepped once as hereinbefore described. When the exit shuttle conveyor moves, limit switch XSLSB in the lower right-hand portion of FIG. 11 closes to energize count coil CT of counter CTR7. Each time that the exit shuttle conveyor is stopped by dynamic braking contactor XSDB, it is restarted by contact *d* of the latter when contactor XSDB is deenergized as hereinbefore described. In this manner, the exit shuttle conveyor indexes or moves intermittently a number of times equal to the number of storage conveyors plus one. This causes counter CTR7 to close its switch *a* to energize closing coil C of relay ALR1. This circuit extends through contact *c* of switch SA, contact *b* of relay ALR1, switch *a* of counter CTR7 and contact *h* of relay XSLSA to closing coil C of relay ALR1.

Relay ALR1 opens its contact *a* in FIG. 6 to prevent operation of the exit shuttle conveyor, opens its contact *b* in FIG. 11 to prevent operation of count coil CT of counter CTR7, closes its contact *c* in the circuit of its trip coil T, closes its contact *d* and closes its contact *e* in FIG. 12.

It is then necessary to press all-transfer switch PS40 in FIG. 12 to energize relay A1CR through contacts *e* of relays X1LR3, X2LR3, X10LR3, XLLR3 and ALR1, contact *d* of relay XCCR and contact *d* of relay ALR2. Relay A1CR closes contacts *a*, *b c* and *d* in FIGS. 9, 10, and 11 to lower stops ST3, ST4, ST5 and ST6 and to start exit transfer-out conveyors 22, 24, 26 and 28 as hereinbefore described to transfer an article from each storage conveyor onto exit shuttle conveyor 30. In order to do this, it is necessary that there be an article against each stop ST3, ST4, ST5 and ST6 so that limit switches 1LS6, 2LS6, 10LS6 and LLS6 in FIGS. 9, 10 and 11 are closed.

When the articles engage limit switches 1LS10, 2LS10, 10LS10 and LLS10, relays X-LR3, X2LR3, X10LR3 and XLLR3 close as hereinbefore described to energize closing coil C of relay ALR2 in FIG. 12 through contacts *d* of these relrays, contact *d* of relay ALR1 and contact *b* of relay ALR2.

Relay ALR2 closes contact *a* in FIG. 6 to start exit shuttle conveyor 30 running. It will be apparent that contact *a* of relay ALR2 closes in shunt of contact *a* of switch SA and contact *a* of relay ALR1 in the circuit of contactor XSH. Relay ALR2 also opens contact *b* in FIG. 12 to deenergize its closing coil C, closes contact *c* in the circuit of its tripping coil T and opens contact *d* to prevent energization of relay A1CR, the latter having deenergized when relays X1LR3, X2LR3, X10LR3 and XLLR3 were hereinbefore closed.

The exit shuttle conveyor now indexes or intermittently moves in the right-hand direction as shown in FIG. 1 until all the articles are removed therefrom by unload transfer-off conveyor 32. It will be apparent that each time exit shuttle conveyor 30 moves one space to convey an article to the righthand end thereof, limit switch ULS2 deenergizes relay UCR in FIG. 12 and the latter opens its contact *a* in FIG. 6 to stop the exit shuttle conveyor. When unload transfer-off conveyor 32 removes such article, relay UCR reenergizes to restart the exit shuttle conveyor.

When all the articles have been removed from the exit shuttle conveyor, limit switches 1LS10, 2LS10, 10LS10 and LLS10 in FIGS. 9, 10, and 11 are open and relays 1LS10A, 2LS10A, 10LS10A and LLS10A deenergize to trip relays X1LR3, X2LR3, X10LR3 and XLLR3. As a result, contacts *e* of the latter close in FIG. 12 to energize tripping coil T of relay ALR2. Relay ALR1 is tripped by contact *d* of switch SA when the latter is turned back to its SINGLE position. This restores the system to its normal condition.

In this event it is desired to cancel an exit selection after it has been made, exit cancel switch PS31 shown in FIGS. 7 and 8 is pressed to open contact *a* and to close contact *b* thereof. Contact *a* of the cancel switch locks out the exit select circuits. Contact *b* of the cancel switch energizes exit cycle cancel relay XCCR. Relay XCCR opens contact *a* in FIG. 7 to lock out relay XJCR thereby to prevent operation of the exit shuttle conveyor from exit index switches PS29 and PS30. Relay XCCR opens contact *b* in FIG. 7 to lock out the select circuits and closes contact *c* in FIG. 8 to energize the tripping coil T of the closed select relay X1LR, X2LR, X10LR or XLLR and opens contact *d* in FIG. 12. This cancellation of a given exit selection can be made during the time following the stopping of the exit shuttle conveyor and while a previously selected article is being transferred from a storage conveyor onto the exit shuttle conveyor and while the exit shuttle conveyor is awaiting the all clear signal from the transfer-out conveyors, that is, reclosure of contacts *a* of relays X1CR, X2CR, X10CR and XLCR in FIG. 6, whereafter the exit shuttle conveyor can be restarted.

*Manual Operation*

When selector switch RS in FIG. 5 is turned to its MAN. operating position to close contact *b* and to open contact *a*, manual control relay MCR energizes. Relay MCR closes its contact *g* in FIG. 6 in the circuit of exit cycle start switch PS28 to permit control of the exit cycle from manual operator's control station panel 4 in FIG. 3. Relay MCR closes contact *h* in FIG. 7 to bypass contacts *b* of the exit select relays. Relay MCR closes its contact *i* in the lower portion of FIG. 8 in the circuit of exit start switches PS41, PS42, PS43 and PS44 and unload start switch PS45 in FIGS. 9, 10, 11 and 12.

In FIG. 6, when contact *g* of manual control relay MCR is closed, start switch PS28 and emergency stop switch SS28 afford control of the exit cycle from exit manual operator's station control panel 4. When contact *i* of relay MCR in the lower left-hand portion of FIG. 8 is closed, No. 1 start switch PS41, No. 2 start switch PS42, No. 10 start switch PS43 and No. L start switch PS44 in FIGS. 9 and 10 can be pressed to cause lowering of the stop ST3, ST4, ST5, or ST6 of the corresponding storage conveyor and to control the associated transfer-out conveyor to move an article from the storage conveyor onto exit shuttle conveyor 30. For this purpose, the start switch closes a circuit in shunt of the limit switch of exit memory device XMD and the remainder of the transfer-out conveyor operation is similar to that hereinbefore described. When contact *h* of relay MCR in FIG. 7 is closed, the exit shuttle conveyor can be indexed or caused to be moved one space by pressing switch PS29 on main operator's station control panel 2 or switch PS30 on exit manual operator's station control panel 4 in FIGS. 2 and 3, these exit index switches being also shown in FIG. 7. Closure of either switch PS29 or PS30 which are connected in parallel causes energization of relay XJCR in a circuit extending through contact *a* of relay XCCR, contact *h* of relay MCR and contact *c* of relay XSLSA. Relay XJCR closes contact *a* in FIG. 6 in shunt of contacts *a* of exit select relays X1LR, X2LR, X10LR and XLLR, opens contact *c* in FIG. 7 to lock out the select circuits and closes contact *b* in FIG. 7 in shunt of switches PS29 and PS30 to maintain itself energized. The exit shuttle conveyor is started when contact *a* of relay XJCR is closed and then operates under the control of limit switches XSLS and XSDLS to move one space as hereinbefore described.

When exit shuttle conveyor 30 has been indexed so that an article reaches the right-hand end thereof at least one space beyond the point directly opposite storage conveyor No. 1 and such article actuates limit ULS2 to close contact a and to open contact b of the latter, unload transfer-off conveyor 32 can be started by pressing unload start switch PS45 on exit manual operator's station control panel 4 in FIG. 3, switch PS45 being also shown in FIG. 12. Closure of switch PS45 completes an energizing circuit from conductor L4 through contact i of relay MCR in the lower left-hand portion of FIG. 8 and then through conductor L14, switch PS45, contact a of limit switch ULS2, contacts a of relays ULR2 and ULR1 and closing coil C of relay ULR1 to conductor L5. The circuit in the lower portion of FIG. 12 then operates in the manner hereinbefore described to control motor MO21 and to operate unload transfer-off conveyor 32 to move the article from exit shuttle conveyor 30 toward accumulator conveyor 34.

It will be apparent that if an article should inadvertently overshoot the last space at the right-hand end of exit shuttle conveyor 30, limit stop control device LSC2 shown in FIGS. 1 and 6 operates to deenergize its relay XPC to stop the exit shuttle conveyor in the same manner as described in the aforementioned patent in connection with limit stop control device LSC1.

The system hereinbefore described is especially adapted to provide a buffer zone ahead of assembly lines for a plurality of automobile bodies of different types such as two-door, four-door, hardtop, convertible, etc. In such use, bodies of only one type would be stored on a storage conveyor. Therefore, if one assembly line has to be closed down because of a shortage of parts or the like for one type of body, these bodies can be stored on the storage conveyors and other types of bodies can still be withdrawn so that the other assembly lines can continue operating.

I claim:

1. In a conveyor system having a buffer storage area including a plurality of storage conveyors for storing articles that are in transit between an incoming conveyor and an outgoing conveyor; means for withdrawing articles from selected storage conveyors to the outgoing conveyor comprising:

an intermittently operable exit conveyor extending past the exit ends of the storage conveyors and having article receiving spaces therealong and being effective in response to each operation thereof to move one increment;

the exit ends of the storage conveyors being spaced apart according to whole number multiples of said increments so that said exit conveyor between movements thereof stops said article receiving spaces thereon in registration with the storage conveyors;

a plurality of selectively operable exit control devices for initiating withdrawal of articles and being operable to establish the storage conveyor origins of successive articles in accordance therewith;

and article withdrawal control means controllable by said exit control devices comprising;

means responsive to operation of selected exit control devices in succession for registering the storage conveyor origins of respective articles and for reserving successive article receiving spaces along the exit conveyor for articles corresponding to respectively successive operations of said exit control devices so that articles withdrawn from storage will be arranged in the same order as the exit control devices are operated;

means for causing operation of said exit conveyor one said increment after each such article receiving space is reserved thereon;

and means operable when each reserved space on said exit conveyor has been moved sufficient increments to reach the storage conveyor having an article for which such space was reserved according to said origin registrations for controlling movement of an article from such storage conveyor onto the exit conveyor during the stopping period of the exit conveyor.

2. The invention defined in claim 1, wherein said exit conveyor has a length sufficient to convey the articles at least one last increment beyond the last storage conveyor of the buffer storage area;

and means responsive to the arrival of each article at the delivery end of the exit conveyor for causing movement of such article toward the outgoing conveyor.

3. The invention defined in claim 1, together with:

a manually operable exit cancel switch for cancelling the withdrawal of an article from a storage conveyor after the withdrawal of such article has been selected;

and means responsive to operation of said exit cancel switch following a selected exit control device operation and before the exit conveyor starts said incremental movement for causing restoration of said article withdrawal control means to its normal position thereby to prevent withdrawal of the canceled article from the storage conveyor.

4. The invention defined in claim 1, wherein said means for registering the storage conveyor origins of articles and for reserving spaces therefor on the exit conveyor comprises:

an exit memory device settable in response to operation of selected exit control devices to register the storage conveyor origins of articles to be withdrawn whereby to reserve successive spaces on the exit conveyor for the articles in the order of their selection; and means controlling operation of said exit memory device in increments in step with and proportional to the incremental movements of said exit conveyor whereby said exit memory device controls movement of articles to the exit conveyor when the reserved spaces reach the corresponding storage conveyors.

5. The invention defined in claim 4, wherein said means for controlling movement of articles from the storage conveyors to the exit conveyor comprises:

an article stop on each storage conveyor normally preventing movement of articles therefrom;

and means controlled by said exit memory device when each reserved space reaches the storages conveyor having an article to be received in such reserved space for operating the corresponding article stop to release one article.

6. The invention defined in claim 5, wherein said means for controlling movement of articles from the storage conveyors to the exit conveyor also comprises:

a transfer-out conveyor between each storage conveyor and the exit conveyor;

and means controlled by said exit memory device and operation of each storage conveyor article stop when the latter releases an article for operating the associated transfer-out conveyor to move the released article into the reserved space on the exit conveyor.

7. The invention defined in claim 1, together with:

a selector switch having a "single" indicative operating position wherein said plurality of selectively operable exit control devices are effective and an "all" indicative operating position wherein said plurality of selectively operable exit control devices are ineffective;

means responsive to operation of said selector switch to its "all" indicative operating position for causing operation of said exit conveyor a plurality of increments thereby to reserve a space on the latter for an article from each storage conveyor;

an all-transfer control switch;

and means responsive to operation of said all-transfer control switch for causing operation of said article movement controlling means thereby to move an article from each storage conveyor onto the exit conveyor.

8. The invention defined in claim 7, together with:

means responsive to arrival of articles from all storage conveyors onto the exit conveyor for operating the latter a plurality of increments thereby to deliver such articles from the exit conveyor.

9. The invention defined in claim 1, together with:
an unload transfer-off conveyor extending from the delivery end of the exit conveyor and being normally ineffective;
and means responsive to arrival of each article at the delivery end of the exit conveyor for operating said unload transfer-off conveyor to convey each article from the exit conveyor.

10. The invention defined in claim 9, together with:
an intermediate conveyor and an accumulator conveyor between said unload transfer-off conveyor and the outgoing conveyor;
manually controllable means for starting said intermediate conveyor to convey articles received thereby to said accumulator conveyor;
and means responsive to accumulation of a predetermined number of articles on said accumulator conveyor for stopping said intermediate conveyor and for restarting the latter when an article is removed therefrom.

References Cited in the file of this patent
UNITED STATES PATENTS

| | | |
|---|---|---|
| 2,315,659 | Russell | Apr. 6, 1943 |
| 2,672,219 | Skillman | Mar. 16, 1954 |